(12) United States Patent
Ritter et al.

(10) Patent No.: US 10,759,692 B2
(45) Date of Patent: Sep. 1, 2020

(54) HIGHLY TRANSMISSIVE GLASSES WITH HIGH SOLARISATION RESISTANCE, USE THEREOF AND METHOD FOR PRODUCTION THEREOF

(71) Applicant: Schott AG, Mainz (DE)

(72) Inventors: Simone Ritter, Mainz (DE); Uwe Kolberg, Mainz (DE); Stefanie Hansen, Gensingen (DE); Thomas Weingaertner, Gau-Algesheim (DE); Caroline de Luca, Mainz (DE); Thomas Kirsch, Mainz (DE); Peter-Franz Skiba, Ruedesheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 16/233,529

(22) Filed: Dec. 27, 2018

(65) Prior Publication Data

US 2019/0152841 A1  May 23, 2019

Related U.S. Application Data

(63) Continuation of application No. 14/328,744, filed on Jul. 11, 2014, which is a continuation of application No. PCT/EP2013/050467, filed on Jan. 11, 2013.

(30) Foreign Application Priority Data

Jan. 12, 2012  (DE) .......................... 10 2012 100 233

(51) Int. Cl.
  *C03C 13/04*  (2006.01)
  *C03C 3/078*  (2006.01)
  (Continued)

(52) U.S. Cl.
  CPC ............ *C03C 13/046* (2013.01); *C03B 5/193* (2013.01); *C03B 5/225* (2013.01); *C03C 3/066* (2013.01);
  (Continued)

(58) Field of Classification Search
  CPC ......... C03C 3/066; C03C 3/068; C03C 3/076; C03C 3/078; C03C 3/095
  See application file for complete search history.

(56) References Cited

U.S. PATENT DOCUMENTS

4,414,012 A * 11/1983 Suto ...................... C03B 19/102
                                                        65/30.1
4,975,102 A * 12/1990 Edahiro ................ C03B 37/014
                                                        385/127
(Continued)

FOREIGN PATENT DOCUMENTS

| CN | 1340033 | 3/2002 |
|---|---|---|
| CN | 1340034 | 3/2002 |

(Continued)

OTHER PUBLICATIONS

Edited by Sumio Sakuhana, "3.1. optical design and optical glass", glass handbook, Japan, Asakura Publishing, Sep. 30, 1975, first edition, 71-73—p. 7.

(Continued)

*Primary Examiner* — Chris H Chu
(74) *Attorney, Agent, or Firm* — Ohlandt, Greeley, Ruggiero & Perle, L.L.P.

(57) ABSTRACT

The glasses of the present disclosure are highly transparent and have very good resistance to solarization. The resistance to solarization arises from the production method. The concentrations of reduced polyvalent ion species are reduced by targeted use of bubbling with an oxidizing gas. Methods for producing glasses and to the uses thereof, particularly as core glasses in optical waveguides, are also provided.

18 Claims, 6 Drawing Sheets

(51) Int. Cl.

| | | |
|---|---|---|
| *G02B 6/02* | (2006.01) | |
| *C03B 5/225* | (2006.01) | |
| *C03C 3/066* | (2006.01) | |
| *C03C 3/068* | (2006.01) | |
| *C03C 3/089* | (2006.01) | |
| *C03C 3/091* | (2006.01) | |
| *C03C 3/095* | (2006.01) | |
| *C03C 3/097* | (2006.01) | |
| *C03C 3/118* | (2006.01) | |
| *C03B 5/193* | (2006.01) | |

(52) U.S. Cl.
CPC .............. *C03C 3/068* (2013.01); *C03C 3/078* (2013.01); *C03C 3/089* (2013.01); *C03C 3/091* (2013.01); *C03C 3/095* (2013.01); *C03C 3/097* (2013.01); *C03C 3/118* (2013.01); *G02B 6/02* (2013.01)

(56) References Cited

U.S. PATENT DOCUMENTS

| | | | |
|---|---|---|---|
| 5,285,517 A * | 2/1994 | Wu | C03C 3/085 359/885 |
| 5,528,107 A | 6/1996 | Marlor et al. | |
| 5,925,468 A | 7/1999 | Stewart | |
| 5,994,248 A * | 11/1999 | Gandarillas-Lastra | C03C 3/078 359/642 |
| 6,096,670 A | 8/2000 | Lautenschlager et al. | |
| 6,627,569 B1 | 9/2003 | Naumann et al. | |
| 6,630,420 B1 | 10/2003 | Naumann et al. | |
| 6,680,266 B1 | 1/2004 | Peuchert et al. | |
| 7,341,965 B2 * | 3/2008 | Schreder | C03B 5/193 385/142 |
| 8,365,555 B2 | 2/2013 | Leister et al. | |
| 2001/0044369 A1 | 11/2001 | Sugimoto et al. | |
| 2003/0064878 A1 | 4/2003 | Sugimoto et al. | |
| 2003/0114291 A1* | 6/2003 | Koyama | C03C 3/087 501/64 |
| 2004/0220038 A1* | 11/2004 | Wolff | C03C 3/062 501/64 |
| 2004/0229743 A1* | 11/2004 | Wolff | C03C 3/066 501/67 |
| 2005/0024713 A1* | 2/2005 | Bourova | C03C 4/0071 359/334 |
| 2005/0037913 A1 | 2/2005 | Peuchert et al. | |
| 2005/0100305 A1 | 5/2005 | Domres et al. | |
| 2005/0213197 A1* | 9/2005 | Tsuda | C03C 3/062 359/341.5 |
| 2006/0205583 A1* | 9/2006 | Naumann | C03C 3/091 501/66 |
| 2007/0149381 A1 | 6/2007 | Wolff | |
| 2007/0175241 A1 | 8/2007 | DeLamielleure et al. | |
| 2008/0076656 A1 | 3/2008 | Suzuki et al. | |
| 2009/0067792 A1 | 3/2009 | Curdt et al. | |
| 2009/0137379 A1 | 5/2009 | Nagai et al. | |
| 2009/0163342 A1 | 6/2009 | Kolberg et al. | |
| 2009/0275462 A1* | 11/2009 | Murata | C03C 3/091 501/66 |
| 2010/0166358 A1* | 7/2010 | Homa | B29D 11/00721 385/12 |
| 2011/0034314 A1 | 2/2011 | Ogino | |
| 2011/0098171 A1 | 4/2011 | Pedeboscq et al. | |
| 2012/0058779 A1 | 3/2012 | Wang et al. | |
| 2012/0058879 A1* | 3/2012 | Kim | C03C 4/02 501/64 |

FOREIGN PATENT DOCUMENTS

| | | |
|---|---|---|
| CN | 101130448 | 2/2008 |
| CN | 102153279 | 8/2011 |
| DE | 3026605 | 2/1982 |
| DE | 10245987 | 5/2004 |
| DE | 102007008299 | 2/2008 |
| DE | 102007063463 | 6/2009 |
| EP | 1468972 | 10/2004 |
| JP | S56121002 | 9/1981 |
| JP | 10-59741 | 3/1998 |
| JP | 11-157869 | 6/1999 |
| JP | 2000-159541 | 6/2000 |
| JP | 2001213635 | 8/2001 |
| JP | 2001213636 | 8/2001 |
| JP | 2003-508339 | 3/2003 |
| JP | 2004123526 | 4/2004 |
| JP | 2004277281 | 10/2004 |
| JP | 2004531445 | 10/2004 |
| JP | 2005502574 | 1/2005 |
| JP | 2005-200289 | 7/2005 |
| JP | 2006306690 | 11/2006 |
| JP | 2007039324 | 2/2007 |
| JP | 2007169157 | 7/2007 |
| JP | 2008150228 | 7/2008 |
| JP | 2009529712 | 8/2009 |
| JP | 2009196878 | 9/2009 |
| JP | 2009203083 | 9/2009 |
| JP | 2009263141 | 11/2009 |
| JP | 2010-30849 | 2/2010 |
| JP | 2010523457 | 7/2010 |
| JP | 2010184816 | 8/2010 |
| JP | 2011513183 | 4/2011 |
| JP | 2011-88794 | 5/2011 |
| JP | 5662204 | 12/2014 |
| WO | 2011098043 | 8/2011 |

OTHER PUBLICATIONS

English translation of Chinese Office action dated Dec. 4, 2015 for corresponding Chinese Patent Application No. 201380005282.8, 11 pages.

International Search Report dated May 24, 2013 corresponding to PCT/EP2013/050467, with English translation, 7 pages.

International Preliminary Report on Patentability dated Jul. 15, 2014 corresponding to PCT /EP2013/050467, with English translation, 15 pages.

Written Opinion of the International Searching Authority dated May 24, 2013 corresponding to PCT/EP2013/050467, with English translation, 13 pages.

O. Corumluoglu et al., "Determination of ferrous iron and total iron in glass by a colorimetric method", Glass Tech, 1999, 40(1), pp. 24-28.

Bermuth, K. et al. "Solarisationserscheinungen an Cer-Und Arsenhaltigen Kalk-Natronsilicatglaesern/Solarization Phenomena in Soda-Lime-Silica Glasses Containing Cerium and Arsenic/ Phenomenes de Solarisation Dans Des Verres Silicosodocalciques Renfermant Du Cerium Et DeL'" Glastechnische Berichte, Verlag Der Deutschen Glastechnischen Gesellschaft, Frankfurt, Germany, vol. 58 No. 3, Jan. 1, 1985, pp. 52-58.

\* cited by examiner

HIGHLY TRANSMISSIVE GLASSES WITH HIGH SOLARISATION RESISTANCE, USE THEREOF AND METHOD FOR PRODUCTION THEREOF

CROSS REFERENCE TO RELATED APPLICATIONS

This application is a continuation of U.S. patent application Ser. No. 14/328,744, filed on Jul. 11, 2014, which is in turn a continuation of International Application No. PCT/EP2013/050467, filed Jan. 11, 2013, which in turn claims the benefit under 35 U.S.C. § 119(a) of German Patent Application No. 10 2012 100 233.9, filed Jan. 12, 2012, the entire contents of each of which are incorporated herein by reference.

BACKGROUND

1. Field of the Disclosure

This invention relates to glasses which are highly transparent and have very good resistance with respect to solarization, a method for their production and their uses. Preferably, the glasses of this invention are used as a core glass in an optical fiber. Furthermore, this invention relates to an optical fiber comprising a cladding glass and the glass according to the present invention as a core glass. This invention further relates to the use of such glasses in the fields of imaging, projection, telecommunication, optical communications engineering, Mobile Drive and laser technology, as well as optical elements or preforms of such optical elements.

2. Discussion of Related Art

Fiber-optic light cables are increasingly used for the transmission of light in different technical and medical fields, e.g. in general industrial engineering, illumination- and traffic engineering, automotive, in the field of medical engineering e.g. dental medicine or endoscopy etc. As a result of their good thermal and chemical resistance, fiber-optic light cables made of glass are regularly used, which consist of single fibers that are put together in fiber bundles. As is generally known, the light in the single optical fibers is transmitted through total internal reflection. The most commonly used optical fibers are step index fibers, which consist of a core of core glass, wherein the core glass features a constant refractive index over its cross section. The core glass is surrounded by a sheath of cladding glass, which features a lower refractive index as the core glass. At the interface between core and cladding glass total internal reflection takes place.

As is generally known, the amount of light, which can be coupled into such fibers is proportional to the square of the numeric aperture (NA) of the fiber and the cross section of the fiber core. NA corresponds to the sinus of the angle range in which light can be received by the fiber. The angle range is also specified as angle of aperture.

Apart from the numeric aperture, naturally the attenuation of the light in the fiber plays a prominent role. Therefore, only core glasses with low attenuation can be used. The raw materials for melting of such core glasses are relatively expensive, due to their high purity. This can result in high manufacturing costs of such fibers or therefrom manufactured optical fibers. Furthermore, toxic components like, $PbO$, $CdO$, $As_2O_3$, $BeO$, $HgO$, $Tl_2O$, $ThO_2$ should not be utilized for reasons of environmental protection.

Apart from the amount of light, which is transmitted in a fiber-optic light cable, often the transmittance of the light with a low color cast plays a prominent role. As a result of the spectral transmission dependency of the core glass, which the fibers contain, a more or less prominent color shift of the color locus of the coupled in light source takes place. This commonly results in yellowness of the emitted light. This interferes with applications, in which a neutral color reproduction is crucial, e.g. in medical endoscopy, in photographic documentation of images for the differentiation of e.g. healthy and malign tissue and others.

Particularly, in mobile applications the reliability of the fiber is of importance, i.e. the aging resistance with regard to exposure of temperature changes between about −50° C. and 110° C., the resistance against mechanical strain, especially the fatigue strength as well as the chemical resistance to environmental influences and cleaning procedures. In this regard, especially the climatic resistance and the resistance of the core against alkali solutions is of importance. Also of importance, is the denseness of the fibers, for they have a direct influence on the loading capacity and the fuel consumption of an airplane or an automobile. The denseness of the step index fibers depends mostly on the denseness of the core glass.

The production of optic step index fibers from multi component glasses is carried out through the so-called double crucible or the bar-pipe process. In each case core and cladding glass are heated to temperatures, which correspond to a range of viscosity between $10^5$ to $10^6$ dPas, and are thereby drawn-out into a fiber. For production of a stable fiber with low attenuation, the features of the core and cladding glass must on the one hand be compatible with each other in a series of characteristics, such as gradient of viscosity, coefficient of thermal expansion, tendency to crystallize, and others. On the other hand, they have to feature a high degree of purity, which, as explained above, is guaranteed by using pure raw materials and most importantly by the process of manufacture. In particular, reactions between core and cladding glass at the interface between core and cladding glass must not occur, such as diffusion or crystallization, which would disturb the total internal reflection of the guided light in the fiber core, and thereby increase attenuation. Moreover, the mechanical stability of the fiber is impaired by crystallization. Moreover, polyvalent components, which function as refining agents during the glass manufacture or are introduced into the glass as contaminants, affect the change of spectral transmission in use of radiation sources. This effect is called solarization.

Furthermore, the melting aggregates are of importance, because they can also cause contamination, and thereby negatively influence attenuation and other features. In this way, the deposition of platinum from a PT-aggregate can increase attenuation parameters in the short wavelength range. In contrast, in a quartz-aggregate the increased solution of the $SiO_2$-aggregate takes place. The increased deposition of $SiO_2$ and contaminants (e.g. Fe) in the glass, leads to a variation of features, such as refractive index or the attenuation. The adjustment of these parameters is hindered by such an initialized more unstable melting process.

As mentioned previously solarization is the reduction of transmission in different wave length ranges of a glass after irradiation with light, such as e.g. UV light. The longer the time of irradiation of a glass is, the higher the extent of this effect. For optical fibers it is essential that the solarization is kept as low as possible, because often they are subject to intensive light exposure.

Solarization can be measured by comparing the transmissions of a glass prior and after irradiation with each other. As a measure here, the decrease of the color temperature compared with the standard light type D65 is used.

The standard light type D65 corresponds to the distribution of the radiation of a Planck's radiator (black body) at a temperature of 6500 K. This more or less corresponds to the distribution of the radiation of day light on a grey cloud-covered day.

The color point and the color temperature D65 are calculated from the transmission spectrum of the optical fiber. At first, the spectrum of the non-irradiated optical fiber is measured, and the color temperature is calculated. After irradiation with sources of light, color centers and defects, which attenuate the transmission in the UV and VIS range, occur in the core glasses. The difference of the color temperatures between the non-irradiated and irradiated optical fiber is calculated and is used as a measure for solarization.

With the irradiation of the glass also the transmission is reduced. The observer realizes a partially obvious shift of the color perception of the transmitted light. For the ordinary observer a difference is noticeable up from a color temperature change D65 of 150 K.

In practice a high color temperature is required for optical fibers to guarantee a good color reproduction and thus a pure color impression of the illuminated object. Especially glasses which are used as core glasses in optical fibers must have low attenuation (in dB/km). After all the light has to be transported in the optical fibers for relatively long distances in a way associated with an absorption which is as low as possible.

DE 102 45 987 B3 describes lead containing core glasses which are characterized by a low attenuation and neutral color transmission and are produced in a manner using environmentally friendly raw materials. The glasses do not contain tin. In the case that this glass would be subjected to tin refining at the high temperatures which are required in this instance, the attenuation at 900 to 1100 nm would strongly increase. In the case of this glass the low attenuation can only be achieved at low wave lengths, in the IR range a strong $Fe^{2+}$ band at about 1050 nm would arise. Furthermore, it is assumed that the glass shows high tendency to solarization, because common refining agents (arsenic and antimony oxide) are used. Furthermore, these refining agents are not desirable due to their toxic effects.

DE 10 2007 063 463 A1 describes a core glass for optical fibers. The glass described in this application has to be refined at low temperatures, because otherwise the content of platinum in the glass becomes too high. $As_2O_3$ and $Sb_2O_3$ are proposed as preferred refining agents. With the use of these refining agents an excellent solarization resistance cannot be achieved. Tin refining is not a recommended option.

DE 3026605 A1 describes optic glasses with good durability. However, it uses high amounts of CaO and MgO. Furthermore, $TiO_2$ is used, which affects attenuation of the glasses especially in the UV-range. For this reason, the attenuation parameters of the present invention are not realized in such glasses, which is furthermore not necessary for their intended applications, because it intends the manufacture of thin glass layers rather than the manufacture of glass fibers.

JP 2009-203083 A describes glass compositions with a low amount of $SiO_2$. Thereby a necessary chemical resistance of fiber glasses is not obtainable. Moreover, many components are used that increase the refractive index, which, due to ever present contaminations, prevents good attenuation.

JP 2009-263141 A teaches optic glasses, which have to contain $TiO_2$ and are refined with classic refining agents. Thereby attenuation parameters according to the present invention are not obtainable. Definitely, in prior art core glasses are known which allow a reasonable attenuation without the use of PbO. But this attenuation normally refers only to wave length ranges of approximately 400 to 800 nm. In the IR wave length range no such attenuations have been achieved. In addition, in prior art the omission of PbO as a glass component results in a strong decrease of the PbO mediated solarization resistance.

SUMMARY

It is the object of the invention to provide glasses having high solarization resistance and low attenuation. The glasses should be used as core glasses in light cables. Furthermore, the glasses should be manufactured with a high purity and they should feature a good resistance, especially against alkaline solutions. The resistance against alkaline solutions is important for the use of the glasses in medical fields. In these fields alkaline solutions are often used as cleaning agents.

The object is solved by a glass comprising $SnO_2$ and features an attenuation of up to 1300 dB/km at a wavelength of 1050 nm. Preferred embodiments feature an attenuation of <1050 dB/km, <900 dB/km, <800 dB/km or even <400 dB/km at said wavelength. Parameters of <400 dB/km are especially achievable at a refractive index of <1.65. The attenuation is determined according to DIN 58141-1. In some preferred embodiments the said attenuation is at least 50 dB/km or 100 dB/km.

The reason for this low attenuation in the near IR range is the highly advantageous ratio of $Fe^{2+}/Fe^{3+}$ which preferably is a numeric value that is as low as possible. This means that preferably more $Fe^{3+}$ than $Fe^{2+}$ is contained in the glass. This advantageous ratio can hardly be determined in the glass, because the content of iron is an impurity of the glass which is only present in very low amounts and thus is below the detection limit of $Fe^{2+}$ and $Fe^{3+}$. Therefore, the attenuation is a measure for the concentration of iron in all oxidation states and for the ratio of $Fe^{2+}/Fe^{3+}$.

A small impurity of iron cannot be prevented. It is introduced by raw materials, but also by adjacent material of the melting aggregate. In preferable embodiments the attenuation at 1050 nm is only <300 dB/km, further preferably <250 dB/km and further preferably <180 dB/km and particularly preferably <150 dB/km.

Thus, the attenuation at 1050 nm is a measure for the amount of $Fe^{2+}$ which is present in the glass. Up to now it has been tried to guarantee a reduction of the content of $Fe^+$ by way of selection of particularly pure raw materials. But this is very expensive and laborious. Low valence states of elements—and thus in the case of iron the component $Fe^{2+}$—are most notably created at high temperatures.

The glasses of this invention are refined by using $SnO_2$. In contrast to the usually applied oxides of arsenic and antimony used as refining agents, the use of $SnO_2$ hardly causes solarization.

The glasses of this invention are bubbled after the refining procedure, to convert a major amount of $Fe^{2+}$ contained in the glass into $Fe^{2+}$. The reason for that is that after the refining procedure at lower temperatures the equilibrium of $Fe^{2+}/Fe^{3+}$ is again shifted into the direction of $Fe^{3+}$. Only after the glass is solidified, the equilibrium is quasi frozen. Thus, according to the present invention, it will be bubbled at relatively low temperatures.

The glass according to the present invention comprises $Fe^{2+}$ and/or $Fe^{3+}$ in a content of preferably 0 to 10 ppm. Further preferably, the glass according to the present invention comprises iron in a content of preferably at least 0.1 and preferably at most 10 ppm (m/m). In preferable embodiments the content of iron is at most 5 ppm, further preferably at most 3 ppm and in particular at most 2 ppm. In this case the content refers to all species of iron, thus in particular $Fe^{2+}$ and $Fe^{3+}$. Unless otherwise indicated, information given in ppm and ppb always refers to mass ratios.

The component $SnO_2$ allows the omission of the conventional refining agents $As_2O_3$ and $Sb_2O_3$. Therefore, preferable glasses of this invention are free of $As_2O_3$ and/or $Sb_2O_3$. Besides their toxic effect arsenic and antimony strongly enhance the tendency of a glass to solarization. The omission of arsenic and antimony makes a contribution to the excellent properties of the glass according to the present invention with respect to its solarization and the environmental friendliness.

Solarization is caused by defect centers (i.e. color centers). $SnO_2$ does not form such centers by itself and apparently also does not stimulate other components to form such centers. According to that, $SnO_2$ does not promote so-called secondary reactions resulting in defect centers. In this respect it is inactive.

Preferably, the content of $SnO_2$ in the glasses of this invention is at least 0.01% by weight, further preferably at least 0.03% by weight and even further preferably at least 0.04% by weight. $SnO_2$ serves as refining agent and compared to other refining agents does not—or hardly—cause solarization. When the amounts are too low, then a satisfactory refining procedure cannot be conducted. When the amounts are too high, then however $SnO_2$ has a negative influence on the tendency to solarization. The latter is caused by the introduction of undesired impurities, such as for example iron oxide, by the $SnO_2$ and in addition by the increased redox potential with these impurities. Therefore, the content of this component in the glass preferably should not exceed a value of 1% by weight, further preferably 0.8% by weight, particularly preferably 0.4% by weight.

Preferably, the glass according to the present invention, even after several hundred hours of irradiation with a 300 W xenon high pressure short-arc lamp, shows no to very small change of the attenuation over the whole wave length range of >400 to 1050 nm. Preferably, the attenuation of an optical fiber having a diameter of 5 mm and a length of 1000 mm at a wave length of 1050 nm is lower than 1300 dB/km, preferably even 1050 dB/km, further preferably lower than 900 dB/km or lower than 800 dB/km, especially preferable this parameter is lower than 400 dB/km, also after an irradiation of 450 hours with a transmitted luminous flux of 1500 lm and/or a 300 W xenon high pressure short-arc lamp.

When in this description is mentioned that glasses are free of one component or that glasses do not contain a special component, then it is meant that it is only allowed that this component is present in the glasses as an impurity. This means that it is not added in essential amounts. According to the present invention, not essential amounts are amounts of lower than 100 ppm, preferably lower than 50 ppm and most preferably lower than 10 ppm.

Preferably, the glasses of this invention are fiber glasses, in particular core glasses in optical fibers. Preferably, therefore the glasses have a fibrous form, i.e. in particular having a length of at least 1 m and preferably a basically circular cross section.

The glass according to the present invention is refined with $SnO_2$. $SnO_2$ is a high temperature refining agent releasing the oxygen which is required for the refining process only at higher temperatures. Thus, during the refining process higher temperatures are necessary than during a refining process using arsenic or antimony oxide. However, higher temperatures result, as mentioned above, in the reduction of polyvalent ions, such as for example iron which is reduced to $Fe^{2+}$. These ions are introduced into the glass by raw materials or by the melting aggregate. Even in the case of the use of highly pure raw materials an impurity in the ppb range is present.

The use of $SnO_2$ as a refining agent and thus the possible omission of other refining agents such as $As_2O_3$ and $Sb_2O_3$ allow the production of a glass having good inner quality (low number of bubbles) and in particular high solarization resistance.

The measures of this invention result in a decrease of the color temperature of the glass caused by solarization of lower than 150 K based on the standard light source D65 after irradiation at the chosen test conditions. The color temperature D65 is calculated from the course of the spectral transmission being measured according to DIN 58141 Part 2. The chosen test conditions are a light source Zeiss Superlux 301, the illuminant: Perkin Elmer 300BF, the dimension of the optical fiber with a diameter of 5 mm and a length of 1000 mm at an ambient temperature of 23° C.

In the presence of iron oxide, the high temperature refining process has a negative influence on the attenuation of the glass. In particular in the case of the use in the IR range a high portion of $Fe^{2+}$ is disadvantageous. $Fe^{2+}$ absorbs at wave lengths of approximately 1050 nm and thus deteriorates the transmission and the attenuation, respectively, of the fiber in the near IR.

According to the present invention the $Fe^{2+}$ mediated problems are solved by bubbling the glass with an oxidizing gas after the refining process. Preferably, the bubbling is carried out at temperatures of at most 1550° C. and in particular at most 1480° C. For some glasses, in particular glasses with a high refractive index of more than 1.65, temperatures of lower than 1300° C. should be selected as a precautionary measure. This is because those components that increase the refractive index are not obtainable in the highest purity. Higher temperatures are counter-productive with respect to the desired effect. Preferably, the oxidizing gas contains oxygen. Preferably, the oxidizing gas mainly consists of oxygen. Alternatively, ozone may be used.

According to the present invention it is not necessary that bubbling is conducted during the refining process. After all, $SnO_2$ is used as a chemical refining agent. Preferably, therefore during the refining process no bubbling is conducted.

During the bubbling step it is necessary that the viscosity of the glass is in a range which is suitable for bubbling. Therefore, the glass should have a viscosity of $10^{0.9}$ to $\leq 10^{2.2}$ dPas at the temperatures at which the bubbling is conducted. In particular, the viscosity of the glass at a temperature of 1300° C. is at most $10^2$ dPas.

In an exemplary manner, the following table shows for three glasses according to the present invention (example glasses 7, 8 and 21 which are described below), how the viscosity of the glasses as a function of the temperature is changed, when the compositions according to the present invention are used.

| Ex. 7 | | Ex. 8 | | Ex. 21 | |
|---|---|---|---|---|---|
| T (° C.) | viscosity log [dPas] | T (° C.) | viscosity log [dPas] | T (° C.) | viscosity log [dPas] |
| 1200 | 2.01 | 1200 | 2.18 | 1080 | 2.14 |
| 1300 | 1.51 | 1300 | 1.70 | 1100 | 1.95 |
| 1350 | 1.30 | 1350 | 1.50 | 1200 | 1.14 |
| 1400 | 1.10 | 1400 | 1.31 | 1240 | 0.86 |
| 1450 | 0.93 | 1450 | 1.14 | | |

Preferably, the bubbling procedure is conducted at temperatures of at least 1000° C., preferably at least 1100° C., more preferably 1200° C. and particularly preferably at least 1350° C. Preferably, the temperatures should not exceed a value of 1550° C., more preferably a value of 1500° C. and most preferably a value of 1480° C., in particular 1400° C. Higher temperatures result in lower viscosity, but also in a shift of the equilibrium of polyvalent components towards lower valences. When the viscosity is too high during the bubbling procedure, then the bubbles in the glass melt cannot or just poorly bubble up, and this results in undesired formation of foam. In the case that the viscosity is too low, also the residence time of the bubbles in the melt is too low. In addition, bubbles are formed which are too big and thus a bubble surface is formed which is too small, wherein this results in an exchange of oxygen which is too low. Since for an efficient exchange of gas between the melt and the bubbles a large interface is required, bubbles which are too big are not desired. Bubble sizes which are preferable according to the present invention are in a diameter range of approximately 10 mm to approximately 100 mm. In the case of bubbles having a form which is not exactly spherical the smallest diameter of the bubbles is meant.

According to the present invention the viscosity of a glass and/or a glass melt is determined with the help of an agitator viscometer.

For example, up to 4 L melt volume is bubbled in a discontinuous aggregate, preferably for at least 20 minutes. Indeed, under special circumstances—dependent on the respective glass and the amount of impurities—also a shorter bubbling time may be sufficient, but in most cases only after about 20 minutes a considerable improvement of the attenuation is achieved. The bubbling time is, thus, preferably at least 10 minutes, further preferred at least 15 minutes, more preferably at least 20 minutes and most preferably at least 25 minutes.

In the case of a continuous melting aggregate with a capacity of 500 to 1000 g/min a person skilled in the art will recognize how much bubbling time is required for achieving an optimum attenuation result.

At these low temperatures the oxidizing gas causes the oxidation of polyvalent ions. In the case of iron $Fe^{2+}$ will be oxidized to $Fe^{3+}$. Thus, the absorption of $Fe^{2+}$ at approximately 1050 nm will be decreased. Thus, the band of trivalent iron at approximately 350 nm will become stronger, but due to the lower coefficient of absorption it is of lower value and due to the position at 350 nm it is not disturbing for this use. The disadvantage of the reduction of polyvalent ions at the high refining temperatures will thus be balanced again by a bubbling step after the refining step. A balanced adjustment of the viscosity results in glasses having very good properties with respect to the bubbles which are present in the glass, despite the further bubbling step.

With the bubbling step after the refining step highly advantageous ratios of $Fe^{2+}/Fe^{3+}$ and $Sn^{2+}/Sn^{4+}$ are achieved in the glass, which result in a very low attenuation of the glass. These ratios cannot be determined analytically in a satisfactory manner and only with great effort (O. Corumluoglu et al. "Determination of ferrous iron and total iron in glass by a colorimetric method", Glass Technol, 1999, 40(1), 24-8). Therefore, the attenuation has to be used as a surrogate parameter.

In the glass system according to the present invention a good correlation prevails between the ratios of $Fe^{2+}/Fe^{3+}$ and $Sn^{2+}/Sn^{4+}$, on the one hand, and the attenuation of the glass, on the other hand. The present iron species cannot be quantified in an analytic manner. According to the present invention the ratio of $Fe^{2+}/Fe^{3+}$ is adjusted such that the attenuation values according to the present invention are achieved. The measures required for that are here described in detail.

According to the present invention the difference of the attenuations of the glass at 900 nm and 700 nm (D900-D700) is preferably lower than 500 dB/km and further preferably lower than 400 dB/km and particularly preferably lower than 300 dB/km. Some glasses even achieve parameters of lower than 150 dB/km and further preferably lower than 100 dB/km or lower than 50 dB/km. This difference (relative values) is a feature for good IR quality of glasses without an error of the absolute measurements by the offset which is sometimes present. A flat attenuation curve over the whole wave length range which is of interest is highly advantageous for the use afterwards.

It is surprising that such a strong effect with respect to the attenuation in the IR range can be achieved by bubbling after the refining step.

Preferably, the glasses of this invention contain at least 8% by weight, further preferably at least 23% by weight, even further preferably at least 24% by weight and particularly preferably at least 25% by weight or even 26% by weight of $SiO_2$.Further preferably, at least 28.3% by weight of $SiO_2$ are contained, particularly preferably at least 34% by weight of $SiO_2$. In some preferred embodiments the glasses even contain at least 35% by weight of $SiO_2$, further preferably at least 42% by weight.

$SiO_2$ is a glass-forming substance. Amounts of this component which are too low result in unstable glasses. In particular the chemical resistance and particularly the acid resistance are compromised in the case of contents of $SiO_2$ which are too low.

But the component $SiO_2$ increases the processing temperatures of the glasses. High processing temperatures result in disadvantages: The very hot melts stronger attack the materials with which they are in contact. Therefore, the used materials show a shorter lifetime. In addition, higher amounts of impurities are introduced into the glass which again may result in undesirable influences on the transmission and thus the attenuation and the solarization. Furthermore, portions of $SiO_2$ which are too high result in a lowering of the numeric aperture ($N_A$). So that the processing temperatures do not become too high, preferably, the content of $SiO_2$ should be limited to a maximum amount of 62.1% by weight. Further preferably, the content of $SiO_2$ in the glass according to the present invention is at most 55% by weight and particularly preferably at most 53% by weight. In particularly preferable embodiments the glass comprises at most 51.8% by weight of $SiO_2$ and even further preferably only at most 50% by weight of $SiO_2$. In a particular embodiment according to the glasses of this invention possess a strongly limited amount of $SiO_2$ in order to realize a high refractive index. These glasses comprise at most 35% by weight, further preferably at most 33% by weight, even further preferably 32% by weight and in particularly preferable at most 31% of $SiO_2$.

Preferably, the glass according to the present invention contains up to 10% by weight, further preferably up to 6% by weight, even further preferably up to 2.8% by weight and particularly preferably at most 1.5% by weight of $Al_2O_3$. The content of $Al_2O_3$ results in an increase of the chemical resistance of the siliceous base matrix. Contents of $Al_2O_3$, which are too high, result in a strong increase of the melting point of the glasses and thus may result in an increased production effort. Particularly in the case of glasses which already have sufficient chemical resistance due to other glass-forming substances, the content of an $Al_2O_3$ according to the present invention is preferably limited to at most 1% by weight, further preferably at most 0.5% by weight and particularly preferable at most 0.3% by weight. In particularly preferred embodiments according to this invention $Al_2O_3$ may be omitted.

Also, $B_2O_3$ may be contained in the glass according to the present invention. In a preferable embodiment at least 0.1% by weight, further preferably 0.5% by weight and particularly preferable at least 6% by weight of $B_2O_3$ are contained. This component lowers the viscosity of the glass and thus the melting, refining and processing temperatures. Since however contents of $B_2O_3$ which are too high may reduce the chemical resistance, in particular with respect to alkali containing media, preferably the content of $B_2O_3$ is at most 24% by weight. Further preferably at most 15% by weight, further preferably at most 5.1% by weight or <5% by weight, even further preferably at most 4% by weight, more preferably 3.5% by weight, and further preferably at most 3% by weight, in particular preferably at most 1.5% by weight of $B_2O_3$ are contained in the glass. In some preferable cases the glass contains less than 1% by weight of $B_2O_3$.

Preferably, the content of $SiO_2$ in the glass is higher than the content of $B_2O_3$. With that an adequate chemical resistance becomes possible. Preferably, the content of $SiO_2$ even should be twice as much the content of $B_2O_3$ or higher. By using a suitable ratio of the components $B_2O_3$ and $SiO_2$ among other things, the required conductivity can be adjusted, so the glass can be heated in a high frequency aggregate. In embodiments, which contain $B_2O_3$, the mass ratio of $SiO_2$ to $B_2O_3$ preferably amounts to more than 5, further preferably more than 6, more preferably more than 7 and in particular preferably more than 8. However, the mass ratio should not be too high, in particular the parameters of 50, preferably 40, further preferably 30 and in particular preferably 15, should not be exceeded.

$B_2O_3$ shows aggressive behavior with respect to certain melting aggregates and therefore requires particular precaution in use. Therefore, according to the present invention it is preferable to guarantee the required viscosity properties of the glass without the use of $B_2O_3$. Particularly preferably, therefore the glass according to the present invention is free of $B_2O_3$.

Preferably, the total content of $SiO_2$, $Al_2O_3$ and $B_2O_3$ is at most 70% by weight, further preferably at most 65% by weight and more preferably at most 60% by weight and particularly preferably at most 50% by weight or at most 40% by weight, so that still a good processability of the glass is facilitated, together with sufficient chemical resistance. For this purpose, the total content of these oxides should preferably be at least 25% by weight, further preferably at least 27% by weight, more preferably at least 30% by weight, particularly preferably at least 40% by weight and more preferably at least 41% by weight.

To improve the chemical resistance $Ta_2O_5$ can be added, especially in amounts of at least 0.4% by weight, further preferably at least 1.2% by weight and particularly preferably at least 3.5% by weight. However, the content of this component should preferably not exceed a value of 22% by weight, further preferably of 10% by weight, more preferably of 9% by weight, particularly preferably 7% by weight and especially preferably 6% by weight.

The glass of this invention preferably comprises at least one alkali oxide. The alkali oxides act as network modifiers and are necessary for the production of the glass in conventional tanks at moderate temperatures. Preferably, at least 0.1% by weight, further preferably at least 0.2% by weight, more preferably at least 5% by weight, further preferably at least 6% by weight, particularly preferably at least 9% by weight are used. With alkali oxides the oxides of Li, Na, K, Rb and Cs are meant. In further preferable embodiments the alkali oxides only comprise oxides of Li, Na and K.

But alkali oxides compromise the chemical resistance of the glass, when they are used in amounts which are too high. In addition, alkali oxides increase the coefficient of expansion which in the case of heat-forming may cause the formation of cracks in the glass. Therefore, the portion of alkali oxides in the glass of this invention is preferably limited to at most 20% by weight, further preferably at most 18% by weight, more preferably at most 15% by weight, particularly preferably at most 10% by weight and especially preferably at most 5% by weight.

Preferably the alkali oxides $Li_2O$, $Na_2O$ and $K_2O$ are used. $Rb_2O$ and/or $Cs_2O$ can also be used. But their portion is preferably limited to amounts of up to 21% by weight, preferably up to 15% by weight and in particular 2% by weight, preferably up to 1.5% by weight, each. Preferably, the glass according to the present invention comprises a mixture of $Li_2O$, $Na_2O$ and $K_2O$ and is free of further alkali oxides.

The ratio of the alkali oxides $Li_2O$, $Na_2O$ and $K_2O$ one to each other and to the alkali oxides in the cladding glass is of importance for the use of the glass according to the present invention as a core glass. Namely, during the glass pulling procedure processes of inter-diffusion of the most mobile ions, thus mainly the alkali ions, take place. Up to a certain extent these processes are desired, since they result in a chemical bond between the core glass and the cladding glass and thus primal guarantee the stability of the fiber. When these processes become too strong or when diffusion of ions takes place which contribute to the formation of crystalline phases through depletion or concentration in the core glass or cladding glass, these diffusion processes become counterproductive. Thus, on the one hand gradients of concentration between the core glass and the cladding glass should be present, but on the other hand they should not become too high.

Preferably, the content of $Na_2O$ is up to 18.5% by weight, further preferably up to 15% by weight, particularly preferably up to 14% by weight and more preferably up to 9% by weight. The content of this component may be at least 1% by weight, preferably at least 2% by weight, further preferably at least 4% by weight and particularly preferably at least 5% by weight. In one embodiment the glasses are even free of $Na_2O$.

The content of $K_2O$ may be up to 25.7% by weight. Particularly preferably however, the portion of $K_2O$ in the glass is lower than the portion of $Na_2O$. A particularly preferable content of $K_2O$ is at most 15% by weight, further preferably at most 12% by weight, even further preferably at most 6.5% by weight, in particular at most 3% by weight or at most 2% by weight and particularly preferably at most 1% by weight. Preferably, the content of this component should be at least 0.9% by weight, further preferably at least 2.9% by weight and particularly preferably at least %. But particular embodiments are free of $K_2O$.

Particular attention must also be focused on the portion of $Li_2O$. The lithium ion is the most mobile component of the system and in addition, in particular in the presence of $Al_2O_3$ and $ZrO_2$ as nucleating agent contributes to the formation of crystalline phases such as $LiAlO_2$. In many glasses $ZrO_2$ is absolutely essential for the adjustment of optical properties. Since many cladding glasses contain $Al_2O_3$ it seems natural to completely omit $Li_2O$ in each core glass to minimize the danger through crystallization effects at the core-cladding interface. However, there are also a number of cladding glasses which itself contain $Li_2O$.

When in the core glass no $Li_2O$ is contained at all, then in the case of $Li_2O$ containing cladding glasses diffusion of $Li_2O$ from the cladding glass into the core glass takes place which may negatively influence the optical quality of the core-cladding interface. Therefore, the glass of this invention preferably contains $Li_2O$.

So that it is possible to combine the glass of this invention with different cladding glasses and to produce a variety of different products thereof, in preferable embodiments it has proved to make sense to provide a portion of $Li_2O$ in the glass according to the present invention. This portion should be high enough to inhibit the negative effects through the diffusion from the $Li_2O$ containing cladding glasses into the core glasses and should be low enough to prevent crystallization effects in $Li_2O$ free, $Al_2O_3$ containing cladding glasses. As the inventors have found out by intensive efforts, this aim is achieved by a portion of $Li_2O$ of preferably at least 0.2% by weight, further preferably at least 0.4% by weight or at least 0.5 to 10% by weight, further preferably of 0.8 to 5% by weight or <3% by weight and particularly preferably of 0.6 to 2% by weight, or even only up to 1% by weight.

Preferably, the glass of this invention contains ZnO in a content of up to 40% by weight, in particular up to 38% by weight. ZnO acts as a network modifier and in addition serves for the adjustment of the optical properties of the glass. Particularly preferably, its content should be limited to at most 28% by weight, further preferably to at most 25% by weight, further preferably at most 24% by weight, more preferably at most 23% by weight and particularly preferably at most 22% by weight. Preferably, ZnO is contained in the glass in a content of at least 0.05% by weight, further preferably at least 3% by weight, particularly preferably at least 8% by weight, at least 10% by weight or at least 11% by weight. Other embodiments contain more than 12% by weight, in particular at least 13% by weight and more preferably at least 16% by weight in the glass. Particularly preferable embodiments even contain at least 20% by weight.

As a network modifier ZnO in contrast to alkali oxides which result in a more or less constant shift of the viscosity curve at all temperatures, results in a stronger decrease at higher temperatures and a weaker decrease or even an increase at lower temperatures. This is a highly desirable behavior since during melting and refining at temperatures which are as low as possible a low viscosity should prevail. This minimizes the attack onto the tank material and prevents yellowness for example by dissolution of platinum from the equipment of the tank.

The glass of this invention may contain BaO. The content of BaO should at most be 57.8% by weight, further preferably at most 42% by weight and particularly preferably at most 30% by weight and further preferably at most 12.8% by weight. In another preferred embodiment according to the invention the glass contains up to 35% by weight, further preferably up to 34% by weight, more preferably up to 33% by weight and particularly preferably up to 32% by weight. In preferable embodiments the content of this component is at least 0.5% by weight, preferably at least 0.8% by weight and further preferably at least 9% by weight. Some preferred embodiments contain at least 5% by weight, further preferably at least 7% by weight, more preferably at least 9% by weight and particularly preferably at least 11% by weight BaO.

In a similar manner to ZnO, BaO increases the refractive index of the glass and contributes due to its high basicity in a similar manner like alkali oxides to the dissolution of acidic components such as $SiO_2$ and $ZrO_2$. However, the tendency to crystallization of BaO is higher than that of ZnO and therefore BaO should only be used in smaller amounts. For reasons of purity and self-absorption also ZnO is preferable. In a particular embodiment therefore, the glass only contains up to 9.2% by weight of BaO.

Furthermore, it proved advantageous for the processability of the glasses in high frequency aggregates, to adjust the mass ratio of BaO to ZnO in embodiments which contain ZnO, to preferably at least 0.01, further preferably at least 0.2, more preferably at least 0.3 and particularly preferably at least 0.5. Thereby the mass ratio should preferably not exceed a value of 22, further preferably 3 and particularly preferably 2.5.

BaO may completely or partially be substituted by SrO. SrO may be contained in amounts of 0 to 24.4% by weight, preferably up to 9% by weight, particularly preferably up to 8% by weight, especially preferably up to 6% by weight, further preferably up to 4% by weight. However, with this measure no clear advantages are achieved in many glasses and SrO does not increase the refractive index in the same extent as BaO. Therefore, in preferable embodiments it is used up to 1% by weight, further preferably 0.8% by weight, particularly preferably up to 0.5% by weight and further preferably is not used at all.

Also, CaO and/or MgO may substitute a part of BaO, however they more easily show negative effects with respect to refractive index, acid resistance and impurities so that preferably they are not used.

In some embodiments, preferably, MgO is contained in a content of 0 to 8% by weight, further preferably 0% by weight to 6% by weight and even further preferably 0% by weight to 3% by weight. CaO may be present in amounts of up to 8% by weight, preferably only up to 6% by weight or up to 3% by weight and further preferably only up to 2 or up to 1% by weight. Particularly preferably, the glass according to the present invention is free of at least one or more of the alkaline earth oxides selected from the group consisting of CaO, MgO, BaO and SrO. Particularly preferably, the glass according to the present invention is free of MgO, since it may show a tendency to the formation of undesired reactions with the cladding glass due to its higher ion mobility compared with other alkaline earth oxides, which again may negatively influence the transmission.

For maintaining the good properties of the glass, the sum of the alkaline earth oxides should preferably not exceed a value of 42% by weight, preferably of 35% by weight. In a preferable embodiment the sum of the alkaline earth content (RO) and ZnO is between 18% by weight and 55% by weight, particularly preferably 20% by weight to 53% by weight and further preferably between 21% by weight to 52% by weight. Further preferable ranges of content of these components are 33 to 48% by weight, 33 to 46% by weight, 34 to 45% by weight and 35 to 44% by weight.

As to the alkaline earth oxides, in summary, it can be said that it depends on the residual components in the glass, which alkaline earth oxides in which amounts should be used.

The base glass system is defined by the components mentioned till now. However, for achieving a high refractive index and at the same time good chemical resistance and low tendency to crystallization often these components are not enough and further auxiliary oxides must be used. In this case in particular $La_2O_3$, $ZrO_2$ and/or $HfO_2$ are preferable. Also, $Ta_2O_5$ can be added according to the present invention.

Preferably, the glass according to the present invention contains $La_2O_3$. This component strongly increases the refractive index of the glass. Preferably, it is used in a portion of 0 to 16.5% by weight, preferably 1.6% by weight to 14.5% by weight and further preferably 4% by weight to 12% by weight. In preferable embodiments the content of this component is at least 5% by weight, further preferably at least 9% by weight, more preferably at least 10% by weight or at least 12% by weight, even more preferably at least 13% by weight or at least 14% by weight. When $La_2O_3$ is used in low amounts, then the achieved increase of the refractive index is less distinctive. When this component is used in amounts which are too high, then the tendency to crystallization strongly increases so that the glass cannot be used any longer for all fiber types. In addition, $La_2O_3$ is extremely aggressive with respect to $SiO_2$ containing refractory materials. For this reason, the content of $La_2O_3$ according to the present invention is preferably limited to at most 25% by weight, further preferably at most 24% by weight or at most 23% by weight, particularly preferably to at most 21% by weight.

$La_2O_3$ may be replaced by equivalent amounts of $Lu_2O_3$. Since however this oxide contains much more impurities, generally it is omitted. Preferably, the glasses of this invention are free of $Sc_2O_3$. In addition, preferably the glasses are free of $Gd_2O_3$, because this component shows a weak band at 580 nm.

Two very helpful components for the adjustment of a high refractive index and for achieving a good chemical resistance are $ZrO_2$ and $HfO_2$. A minimum content of $HfO_2$ of 0.01% by weight or 0.02% by weight is preferable, since $HfO_2$ counteracts the tendency to crystallization of the glass already in small amounts. For achieving a high refractive index, a minimum content of 1.4% by weight of the sum of $ZrO_2$ and $HfO_2$ is preferred. Preferably, the content of $ZrO_2$ is 0.1% by weight to 10% by weight and the content of $HfO_2$ is preferably 0.03% by weight to 14.2% by weight, wherein further preferable is a content of 1% by weight to 6.9% by weight of $ZrO_2$, more preferably 2.1% by weight to 6% by weight and particularly preferably 0.04% by weight to 3% by weight of $HfO_2$ and in particular 0.05% by weight to 1% by weight. In a particularly preferred embodiment the content of $ZrO_2$ is at least 0.5% by weight or at least 1% by weight, preferably at least 3% by weight; the content of $ZrO_2$ should preferably not exceed 8 or 6% by weight. Here it is surprising that despite the small preferred minimum content of $HfO_2$ already positive effects on the tendency to crystallization can be seen. But at the moment the prize and the purity of $HfO_2$ compared with $ZrO_2$ are still not competitive. For this reason, the content of $HfO_2$ should not exceed a value of 2% by weight and in particular 1.5% by weight.

The glass according to the present invention may contain up to 7.5% by weight of $GeO_2$. $GeO_2$ is a good glass-forming substance and is advantageous in particular in the case of high demands in the field of transmission and/or attenuation in the IR range. Preferably, it is contained in the glass in an amount of up to 4% by weight and further preferably up to 3% by weight. Preferably the glass is free of $GeO_2$. Also, $Ga_2O_3$ is a good glass-forming substance and can be contained in the glass with up to 5% by weight, preferably up to 4% by weight and particularly preferably up to 3% by weight. However, other embodiments are free of $Ga_2O_3$.

Furthermore, the glass according to the present invention may contain up to 22% by weight, preferably up to 10% by weight, further preferably up to 9% by weight, particularly preferably up to 8% by weight, more preferably up to 5% by weight or up to 4% by weight of $Ta_2O_5$, wherein the minimum content is preferably at least 0.3% by weight or at least 0.5% by weight. The oxide can be used for the adjustment of the optical properties. It has to be accurately considered in interplay with the other highly refractive oxides ($ZrO_2$, $La_2O_3$, $HfO_2$), whether the increase of the refractive index is not better achieved by the use of the oxides $ZrO_2$, $La_2O_3$ and $HfO_2$.

Also, as an alternative to $La_2O_3$, $Y_2O_3$ may be used. Preferably, the glass contains 0 to 20% by weight of $Y_2O_3$. However also due to financial reasons preferably the glass does not contain $Y_2O_3$. Preferably, the total content of $Ta_2O_5$ and $Y_2O_3$ is at most 30% by weight for the adjustment of optical properties according to the present invention.

Preferably, the content of fluorine and/or fluoride in the glass according to the present invention is 0% by weight to 3% by weight, further preferably 0% by weight to 2% by weight. Preferably, the glass is free of this component.

PbO may be contained in the glass according to the present invention, but only in an amount which is not higher than 30% by weight, further preferably at most 20% by weight. Preferably, PbO is used in amounts of at least 0.01% by weight, further preferably at least 0.1% by weight. This component protects the glass against solarization. Since Pb may be harmful to health, particularly preferably the glasses according to the present invention are free of PbO. It is remarkable that many of the glasses according to the present invention achieve excellent solarization resistance without the use of PbO.

$P_2O_5$ may be contained in the glasses. It decreases the viscosity. Since however crystallization stability and resistance may be reduced, the content of $P_2O_5$ is preferably limited to up to 6% by weight and further preferably up to 4% by weight. In addition, $P_2O_5$ is a component which increases the tendency to solarization. Particularly preferably, the glass according to the present invention is free of $P_2O_5$ also due to the danger of strongly exothermal batch reactions, the formation of undesired crystallization products and the tendency to solarization.

The content of coloring impurities such as $Cr_2O_3$, NiO, CuO, CoO, $Fe_2O_3$ and further coloring elements should be as low as possible. Therefore, the upper limit of 10 ppm, preferably 5 ppm, further preferably 3 ppm, more preferably 2 ppm and particularly preferably 0.5 ppm should not be exceeded.

Preferably, the glass according to the present invention is free of oxides of Bi, since they cause yellowness of the glass due to self-absorption in the near UV range. Moreover, $Bi_2O_3$ is easily reduced to $Bi^0$ at high temperatures, which results in a grey veil.

Further, the glass according to the present invention is preferably free of platinum. Preferably, also $Ag_2O$, $Au_2O_3$ and $Tl_2O$ are not contained in the glasses according to the present invention.

Due to technical reasons the glass of this invention may contain MnO in low amounts. MnO improves the color point shift, when it is used in low amounts. In amounts which are too high MnO results in solarization and causes after irradiation through photo oxidation to $Mn^{3+}$ a band at 550 nm. Therefore, the content of this component is at most 500 ppb, preferably <250 ppb, further preferably <150 ppb. Particularly preferable, the glass according to the present invention is free of MnO.

For the fibers produced from the glass according to the present invention two applications are known. On the one hand, an attenuation over the whole spectral range which is as low as possible is desired. In this case a color temperature shift, which is as low as possible, is required. This makes sense in the case, when a quantity of light which is as high as possible should be transmitted. On the other hand, a color temperature which is as neutral as possible is required, when objects should be illuminated with light which is akin to daylight. This results in a high color temperature and a negative color temperature shift in the case of irradiation.

The element manganese exists in the glass in the oxidation states $Mn^{2+}$ and $Mn^{3+}$. The oxidation state $Mn^{2+}$ is nearly colorless and does not cause any bands in the attenuation spectrum. The oxidation state $Mn^{3+}$ shows a broad absorption around 550 nm which results in a reddish color impression. However together with the bands of $Fe^{2+}$ and $Fe^{3+}$ a neutral color shade results. At high refining temperatures around 1700° C. manganese nearly exclusively exists (>99 in the oxidation state $Mn^{2+}$. Through oxidation with oxygen or irradiation with intensive UV light $Mn^{2+}$ may be converted into $Mn^{3+}$.

For an attenuation which is as low as possible it has to be prevented that the glass contains appreciable amounts of manganese, since the reactions mentioned above cannot be avoided. Therefore, for this application a content of manganese of <200 ppb, preferably <100 ppb and particularly preferably <50 ppb is to be adhered to. The content of MnO in the glass according to the present invention is preferably <200 ppb.

For obtaining a fiber with high color-neutrality it may be useful to add manganese in an amount of 200 to 500 ppb. A content of MnO in the glass according to the present invention of 200 to 500 ppb is preferred for obtaining a fiber with high color-neutrality. The activation of the color center $Mn^{3+}$ may be achieved through a temporary irradiation with UV light.

The doping with manganese may be achieved through suitably selected raw materials contaminated with manganese oxide, through the addition of MnO as a separate component or through a structural element of the melting aggregate alloyed with manganese. Preferably, the release of manganese can be controlled through the temperature scheme of the structural element within certain limits.

Prior to irradiation of a glass having a content of manganese of higher than 500 ppb the attenuation values at 550 nm are <300 dB/Km. After an irradiation for few hours the band around 550 nm rises to >300 dB/km. In an exemplary manner, FIG. 5 shows a glass having a content of manganese which is much higher than 500 ppm to highlight the effect more clearly. FIG. 5 shows the attenuation spectrum of an example glass 11 containing 1.5 ppm of manganese which already after three hours shows an attenuation value of higher than 300 dB/km at 550 nm.

Preferably, the glass is free of As and Sb, since these components are toxicologically questionable and thus often are not accepted. In addition, these two components cause solarization. It is an essential advantage of this invention that glasses with solarization resistance can be produced without the use of these components.

In addition, preferably the glasses are free of Nb and/or Ti, since these components indeed partially increase the stability with respect to solarization, but at the same time also increase the attenuation in the short-wavelength range. The self-absorption in the UV range results in undesired yellowness of the glasses. Since Ce shows a similar behavior in this respect like Ti, it is also preferable, when the glass is free of this component. It is an advantage of this invention that the solarization stabilizers Ti, Ce and Pb can be omitted and nevertheless a high solarization resistance is achieved. Preferably, the glass according to the present invention is free of components which are not mentioned in this description. In particular in the case of $Nb_2O_5$ it has to be considered that the purity available at the moment is not satisfactory and that also undesired interface effects with a part of the cladding glasses are induced which may result in an increase of the attenuation. Due to this reason, preferably the glass does not contain $Nb_2O_5$.

Preferable glasses of this invention have the following composition in percent by weight:

|  | from | to |
|---|---|---|
| $B_2O_3$ | 0 | 24 |
| $SiO_2$ | 23 | 62.1 |
| $Al_2O_3$ | 0 | 10 |
| $Li_2O$ | 0 | 10 |
| $Na_2O$ | 0 | 18.5 |
| $K_2O$ | 0 | 25.7 |
| BaO | 0 | 57.8 |
| ZnO | 0 | 40 |
| $La_2O_3$ | 0 | 25 |
| $ZrO_2$ | 0 | 10 |
| $HfO_2$ | 0 | 14.2 |
| $SnO_2$ | >0 | 2 |
| MgO | 0 | 8 |
| CaO | 0 | 8 |
| SrO | 0 | 24.4 |
| $Ta_2O_5$ | 0 | 22 |
| $Y_2O_3$ | 0 | 11.9 |
| $Rb_2O$ | 0 | 15 |
| $Cs_2O$ | 0 | 21 |
| $GeO_2$ | 0 | 7.5 |
| F | 0 | 2 |
| $\Sigma R_2O$ | 5 | 20 |
| $\Sigma$ MgO, CaO, SrO, ZnO | 20 | 42 |

Particularly preferable glasses of this invention have the following composition in percent by weight:

|  | from | to |
|---|---|---|
| $B_2O_3$ | 0 | 0 |
| $SiO_2$ | 35 | 50 |
| $Al_2O_3$ | 1 | 10 |
| $Li_2O$ | 0 | 1 |
| $Na_2O$ | 0 | 15 |
| $K_2O$ | 0 | 15 |
| BaO | 20 | 30 |
| ZnO | 0 | 15 |
| $La_2O_3$ | 0 | 10 |
| $ZrO_2$ | 0.1 | 10 |

|  | from | to |
| --- | --- | --- |
| P₂O₅ | 0 | 6 |
| HfO₂ | 0 | 0 |
| SnO₂ | >0 | 0.4 |
| MgO | 0 | 8 |
| CaO | 0 | 8 |
| SrO | 0 | 8 |
| Y₂O₃ | 0 | 0 |
| Rb₂O | 0 | 0 |
| Cs₂O | 0 | 1 |
| GeO₂ | 0 | 0 |
| Σ R₂O | 5 | 15 |
| Σ MgO, CaO, SrO | 0 | 8 |

Other particularly preferable glasses of this invention have the following composition in percent by weight:

|  | from | to |
| --- | --- | --- |
| B₂O₃ | 0 | 1 |
| SiO₂ | 42 | 53 |
| Al₂O₃ | 0 | 1.5 |
| Li₂O | 0 | 3 |
| Na₂O | 0 | 14 |
| K₂O | 0 | 12 |
| BaO | 0 | 0.9 |
| ZnO | 16 | 38 |
| La₂O₃ | 0 | 0 |
| ZrO₂ | 0 | 2 |
| HfO₂ | 0 | 0 |
| SnO₂ | >0 | 0.4 |
| MgO | 0 | 6 |
| CaO | 0 | 5 |
| SrO | 0 | 6 |
| Y₂O₃ | 0 | 0 |
| Rb₂O | 0 | 0 |
| Cs₂O | 0 | 0 |
| GeO₂ | 0 | 0 |
| F | 0 | 2 |
| Σ R₂O | >2 | |

Other particularly preferable glasses of this invention have the following composition in percent by weight:

|  | from | to |
| --- | --- | --- |
| B₂O₃ | 6 | 24 |
| SiO₂ | 25 | 55 |
| Al₂O₃ | 0 | 0 |
| Li₂O | 0 | 10 |
| Na₂O | 0 | 14 |
| K₂O | 0 | 4.4 |
| BaO | 16 | 42 |
| ZnO | 3 | 40 |
| La₂O₃ | 0 | 0 |
| ZrO₂ | 0 | 1 |
| HfO₂ | 0 | 0 |
| SnO₂ | >0 | 0.4 |
| MgO | 0 | 3 |
| CaO | 0 | 3 |
| SrO | 0 | 4 |
| Y₂O₃ | 0 | 0 |
| Rb₂O | 0 | 0 |
| Cs₂O | 0 | 0 |
| GeO₂ | 0 | 0 |
| F | 0 | 3 |

The glasses having the following composition in percent by weight are particularly preferable according to the present invention:

|  | from | to |
| --- | --- | --- |
| B₂O₃ | 0 | 5.1 |
| SiO₂ | 28.3 | 62.1 |
| Al₂O₃ | 0 | 0 |
| Li₂O | 0.08 | 9.9 |
| Na₂O | 0 | 18.5 |
| K₂O | 0 | 25.7 |
| BaO | 0.5 | 12.8 |
| ZnO | 13 | 37.2 |
| La₂O₃ | 1.6 | 14.5 |
| ZrO₂ | 2.1 | 9.8 |
| HfO₂ | 0.04 | 14.2 |
| SnO₂ | >0 | 0.3 |
| MgO | 0 | 1.3 |
| CaO | 0 | 1.9 |
| SrO | 0 | 9 |
| Y₂O₃ | 0 | 0 |
| Rb₂O | 0 | 15 |
| Cs₂O | 0 | 21 |
| GeO₂ | 0 | 7.5 |

Other particularly preferable glasses of this invention have the following composition in percent by weight:

|  | from | to |
| --- | --- | --- |
| B₂O₃ | 0 | 15 |
| SiO₂ | 34.5 | 51.8 |
| Al₂O₃ | 0.1 | 2.8 |
| Li₂O | 0 | 0.2 |
| Na₂O | 2.7 | 8.9 |
| K₂O | 0.1 | 1.4 |
| BaO | 14.7 | 57.8 |
| ZnO | 0 | 17 |
| La₂O₃ | 0 | 16.4 |
| ZrO₂ | 0 | 6.9 |
| HfO₂ | 0 | 0 |
| SnO₂ | >0 | 0.4 |
| MgO | 0 | 2.9 |
| CaO | 0 | 4.8 |
| SrO | 0 | 24.4 |
| Y₂O₃ | 0 | 11.9 |
| Rb₂O | 0 | 3.9 |
| Cs₂O | 0 | 5.8 |
| GeO₂ | 0 | 0 |

In further preferred embodiments the glasses according to the present invention have the following composition in percent by weight:

|  | from | to |
| --- | --- | --- |
| B₂O₃ | 0.1 | <5 |
| SiO₂ | 23 | 35 |
| Al₂O₃ | 0 | 1 |
| Li₂O | 0.2 | 4 |
| Na₂O | 0 | <3 |
| K₂O | 0 | 3 |
| BaO | 5 | 35 |
| ZnO | 8 | 25 |
| La₂O₃ | 10 | 25 |
| ZrO₂ | 0.5 | 9 |
| HfO₂ | 0.01 | 2 |
| SnO₂ | 0.01 | 2 |
| CaO | 0 | 3 |
| SrO | 0 | 1 |
| Ta₂O₅ | 0 | 22 |

Here R₂O is the sum of the contents of all alkali metal oxides.

One or more of the following components may be contained: Cs₂O, Rb₂O, MgO, CaO, SrO, Gd₂O₃, Lu₂O₃, Sc₂O₃, Y₂O₃, In₂O₃, Ga₂O₃ and WO₃.

The following components should not be contained in the glass or only in concentrations which are impurities of the raw materials which cannot be avoided: $TiO_2$, $CeO_2$, $Nb_2O_5$, $MoO_3$, $Bi_2O_3$, PbO, CdO, $Tl_2O$, $As_2O_3$, $Sb_2O_3$, $SO_3$, $SeO_2$, $TeO_2$, BeO, radioactive elements and coloring components, insofar not described otherwise in the text. In particular $TiO_2$ should be omitted, because this component can lead to a considerable absorption in the UV-range. In preferable embodiments also the component $WO_3$ is omitted.

The components $TiO_2$, $CeO_2$, $Nb_2O_5$ and/or $Bi_2O_3$ can be contained in the glass according to the present invention up to at most 0.5% by weight, preferably up to 0.3% by weight and particularly preferably up to 0.2% by weight. In a preferred embodiment the glass is free of these components.

Preferably the glasses according to the present invention are free of optical active components, in particular $Sm_2O_3$, $Nd_2O_3$, $Dy_2O_3$, $Pr_2O_3$, $Eu_2O_3$, $Yb_2O_3$, $Tb_2O_3$, $Er_2O_3$, $Tm_2O_3$ and/or $Ho_2O_3$. $CeO_2$ can be used to stabilize against solarization. However, $CeO_2$ absorbs in the UV-range, so that preferable glasses according to this invention do not contain $CeO_2$.

The content of the sum of components alkaline earth metal oxides, $La_2O_3$, $Ta_2O_5$, $ZrO_2$ and $HfO_2$, especially for glasses with a refractive index of more than 1.65, preferably amounts to at least 40% by weight, further preferably at least 42% by weight, more preferably at least 50% by weight and particularly preferably at least 55% by weight. If the content of these components is too low, the preferred refractive index is usually not obtainable. Conditional to the formulation this sum should not exceed a value of 72% by weight.

The glass can further comprise fluorine and/or fluoride and/or chlorine and/or chloride. The content of fluoride preferably amounts to up to 0.6% by weight, further preferably up to 0.55% by weight. Chloride can be contained in the glass in an amount of at most 0.2% by weight, preferably up to 0.15% by weight. Particular embodiments of the glass are free of fluorine and/or fluoride and/or chlorine and/or chloride. Preferably, the glass of this invention is a core glass in an optical fiber. Cladding glasses which are suitable for this core glass are described below. The glass of this invention can be obtained with the subsequently described method.

This invention also refers to a method for the production of a glass according to the present invention in a melting device with a melting part, a refining part and a conditioning part, comprising the steps: melting the mixture in the melting part, refining the melt in the refining part, bubbling the melt in the conditioning part with an oxidizing gas after the refining step.

During the bubbling step, preferably, the glass is kept in a viscosity range of $10^{0.9}$ to $10^{2.2}$ dPas.

In the method according to the present invention, preferably, the refining step is conducted at temperatures of at least 1600° C., further preferably at least 1650° C. and particularly preferably at least 1700° C. These temperatures are necessary so that the refining agent $SnO_2$ can take full effect. But temperatures which are too high result in higher values of the $Fe^{2+}/Fe^{3+}$ ratio—thus higher portions of the reduced form. This effect will be decreased with the measure that the values of the refining temperature do preferably not exceed 2000° C., further preferably 1900° C. and particularly preferably 1800° C.

The approach of a bubbling step after a refining step is contradictory to the expert knowledge of glass smelters according to which after a refining process no gasses are allowed to be introduced into the melt; because the reason of the refining step is the removal of bubbles from the glass. Therefore, till today bubbling after refining has been assumed to be counter-productive. Now it was shown that with an adequate process management the product application is not compromised, even in an individual case in which the bubble quality of the glass may be reduced. Thereby, a glass having excellent properties with respect to solarization and attenuation can be obtained. Previously, glasses for applications in optical fibers had to be refined with arsenic or antimony. The technique according to the present invention allows tin refining also for these glasses.

When the production method is conducted without the bubbling step, then a respective glass has a portion of $Sn^{2+}$, based on the portion of the total amount of tin in the glass of >5% to <20%. The bubbling step results in the attenuation according to the present invention of at 1050 nm and a content of $Sn^{2+}$, based on the total amount of tin of <5%. Depending on the desired application the attenuation can be modified in this way.

In addition, the bubbling step removes water from the glass. Water absorbs in the near IR like $Fe^{2+}$. Preferably, this band may be minimized through the bubbling step using dried gas.

Furthermore, the bubbling step results in an additional homogenization of the glass resulting in fewer scattering terms in the glass and thus has a positive influence on the transmission and the attenuation, respectively. So this results in a decrease of the attenuation of the glasses according to the present invention in the whole IR wave length range by as much as 700 dB/km, which in particular is of advantage for long application lengths of optical fibers.

According to the present invention, the bubbling step should not be conducted at temperatures which are too high. Therefore, preferably according to the present invention the bubbling step is conducted at temperatures of lower than 1550° C., preferably of lower than 1500° C., more preferably of lower than 1480° C., further preferably lower than 1450° C., even further preferably 1400° C. and particularly preferably lower than 1350° C. At temperatures which are too high it is possible that the aim of the bubbling is not achieved, since the polyvalent ions, in particular iron, are reduced again. But the reason of the bubbling step is exactly to counteract this phenomenon. With decreasing temperature, the viscosity increases. Therefore, preferably the temperature during the bubbling step should not fall below a value of 1000° C., preferably 1200° C. and further preferably 1250° C. It is important to control the viscosity of the melt during the bubbling process. During the bubbling process the melt has a viscosity of preferably at least $10^{0.8}$ dPas and preferably at most $10^{2.2}$ dPas. When the viscosity is too low, then foam formation may take place.

Preferably, the oxidizing gas is introduced into the melt by means of quartz tubes or bottom bubbling.

The glass mixture may be melted with the help of high frequency heating. But preferably, it is also possible to melt the mixture in a forced cooling ceramic tank with electrodes and/or burner heating devices. Preferably however, the refining vessel is heated with high frequency. The conditioning vessel is preferably operated by means of an electric resistance heating.

According to the present invention preferably "high frequency heating" means a method in which the mixture to be heated is heated by means of inductive coupling of an alternating electromagnetic field. Preferably, the alternating electromagnetic field provides frequencies of at least 50 kHz, further preferably at least 100 kHz. Preferably, the frequency is at most 5 MHz, further preferably at most 3 MHz and particularly preferably at most 1 MHz.

The electromagnetic field causes alternating currents in the electrically conductive, preferably preheated glass melt which due to Joule heat results in direct heating of the melt. Preferably, the glass melt should have an electric conductivity of higher than 0.1 $\Omega^{-1}$ $cm^{-1}$ at 1200° C. The glass melts obtained under consideration of the composition ranges according to the present invention exhibit such conductivities.

Since with this process the introduction of energy is directly achieved in the melt, it is possible to cool the melting vessel from outside. This may in particular be achieved by free radiation, air cooling or water cooling.

The walls of the melting vessel—preferably of metal—preferably have slits so that the high frequency radiation can permeate through. With the preferred water cooling in the wall area a skull crust of species-specific material is formed in which the melt is embedded. So melting temperatures of up to 3000° C. can be achieved. The crust formed on the wall of the crucible prevents the contact of the melt with the crucible material. So, material removal of the crucible and material introduction from the crucible are obviated.

Through the use of a skull crucible the normal use of electrodes projecting into the melt can be abandoned so that possible impurities with the electrode material are prevented.

Preferably, the refining vessel consists of coolant-cooled side walls and bottom. They also preferably consist of metal or a metal alloy. In the case of a non-coloring alloy/metal it may be that it is not coated. A preferable embodiment comprises vessel walls consisting of aluminum or an aluminum alloy. However, further embodiments are also vessels of nickel-base alloys, copper, brass, noble metals (e.g. Pt metal) or stainless steels and mixtures thereof which in every case must carry a coating to avoid contamination of the melt with coloring ions.

Coatings may consist of fluorine containing plastics, such as e.g. Teflon, or of other materials/oxides such as $Al_2O_3$, MgO, $ZrO_2$, $Y_2O_3$, which reliably prevent the transfer of ions from the metallic wall of the vessel. Preferably, during the operation the melt is inductively heated via an alternating electromagnetic high frequency field. A conductive electric heating via electrodes is also possible, but is only used, when the electric conductivity at a maximum value of the melting temperature which is allowed is not sufficient for a direct high frequency heating of the melt. The heating via alternative radiation heaters, in an electric manner or in the form of a burner working with fossil fuels is also possible. For the initiation process of the coupling of the crucible content with the alternating electromagnetic field preferably such an additional heating in the form of a burner working with fossil fuels is used.

The melting vessel is a skull crucible with forced cooling or a ceramic tank which preferably comprises forced cooling.

An optical fiber, which comprises the glass according to the present invention as core glass and is sheathed with a cladding glass is also in accordance with the present invention. The optical fiber is preferably a step-index fiber. To guarantee a sufficient stability of the fiber, the core glass should exhibit a coefficient of thermal expansion $\alpha_{(20/300°\ C.)}$ of at least 1.5 to $2.6 \times 10^{-6}$ $K^{-1}$ above that of the used cladding glass.

The refractive index of the cladding glass is lower than that of the core glass so that the light is reflected at the interface between the core and the cladding glass. Preferably, the refractive index of the core glass is between 1.55 and 1.75 and in particular at least 1.65. In particularly preferred embodiments the refractive index is between 1.69 to 1.74, particularly preferably 1.70 to 1.725. Preferably, the refractive index of the cladding glass is between 1.48 and 1.52.

The Abbe numbers $v_d$ of the glasses according to the present invention lie in a range of 42 to 60, preferably of 43 to 52, further preferably of 44 to 51 and particularly preferably of 45 to 50.

A cladding glass which is suitable for use with a glass according to the present invention in an optical fiber preferably has a content of $SiO_2$ of >60% by weight, further preferably >65% by weight and particularly preferably of at least 69% by weight. Preferably, the content of $SiO_2$ is at most 75% by weight and particularly preferably up to 73% by weight. The cladding glass surrounds the glass according to the present invention in the optical fiber. The glass according to the present invention forms the so-called core glass. Therefore, tendentially the cladding glass is subjected to stronger environmental influences than the core glass. A high content of $SiO_2$ imparts better chemical resistance. Thus, preferably, the content of this component in the cladding glass is higher than that in the core glass.

Furthermore, the cladding glass comprises at least 5.5% by weight of alkali oxides. Further preferable, the content of alkali oxides of the cladding glass is at least 7% by weight and particularly preferably at least 8% by weight. In this case, preferably, alkali oxides comprise $Na_2O$, $K_2O$, $Li_2O$.

Preferably, the content of $Na_2O$ is at least 0.5% by weight, further preferably at least 2% by weight. In a particular embodiment of the cladding glass at least 6% by weight of $Na_2O$ are contained in the cladding glass. Preferably, the content of $Na_2O$ is at most 15.5% by weight, further preferably at most 15% by weight.

Preferably, $Li_2O$ is present in the glass in a portion of up to 0.7% by weight, further preferably up to 0.6% by weight. In preferable embodiments the glass is free of $Li_2O$.

Preferably, the content of $K_2O$ of the cladding glass is at least 2% by weight, further preferably at least 2.5% by weight. The content of $K_2O$ is at most 8% by weight, preferably up to 7.5% by weight. In preferable embodiments the glass is free of $K_2O$. A preferable cladding glass apart from $Na_2O$ and $K_2O$ does not contain further alkali oxides.

Furthermore, a cladding glass according to the present invention comprises at least 0.5% by weight of oxides selected from the group consisting of CaO, MgO, BaO and ZnO and mixtures thereof. Further preferably, the total content of these oxides is at least 0.6% by weight. Preferably, the total content of such oxides is at most 12% by weight, preferably at most 11% by weight, further preferably at most 5% by weight, particularly preferably at most 2.5% by weight. Preferably, the cladding glass exactly comprises two oxides selected from the group consisting of CaO, MgO, BaO and ZnO. Especially preferably, the cladding glass only comprises one oxide selected from the group consisting of CaO, MgO, BaO and ZnO.

Furthermore, a cladding glass according to the present invention comprises $Al_2O_3$ in a content of at least 0.5% by weight, preferably 1% by weight, wherein further preferably at least 2% by weight of $Al_2O_3$ are contained in the glass. However, the cladding glass comprises at most 7.5% by weight, preferably up to 7% by weight, further preferably at most 3% by weight and even further preferably 1% by weight of $Al_2O_3$.

Furthermore, the cladding glass may comprise $B_2O_3$, wherein at least 9% by weight, preferably at least 9.5% by weight of $B_2O_3$ are contained in the cladding glass. Particularly preferably, the cladding glass contains at most 19% by weight, particularly preferably up to 18.5% by weight of $B_2O_3$.

In preferable embodiments the cladding glass comprises a higher content of the sum of the components $B_2O_3$ and $Al_2O_3$ than the core glass.

Preferably, the content of $SiO_2$ in the cladding glass is higher than the $SiO_2$ content in the core glass. Furthermore, preferably, the content of $La_2O_3$ in the cladding glass is much lower than that in the core glass. Portions of $SiO_2$ in the core which are too high do not longer allow the adjustment of the relatively high refractive indexes being adjusted with $La_2O_3$. Furthermore, preferably, the content of ZnO in the cladding glass is much lower than that in the core glass. The reason for that is that preferably the viscosity of the core glass is lower than that of the cladding glass. This improves the tensile properties of the fiber. In preferable embodiments the sum of the contents of ZnO and BaO in the cladding glass is lower than this sum in the core glass.

The cladding glass may contain $ZrO_2$, wherein preferably at most 0.04% by weight, further preferably up to 0.03% by weight of $ZrO_2$ is present in the cladding glass.

$As_2O_3$ may be contained in the glass in a content of up to 0.05% by weight, preferably up to 0.01% by weight. Arsenic oxide is responsible for solarization. For the cladding glass a good attenuation is not important in such an extent than for the core glass according to the present invention. Especially preferably, nevertheless, the cladding glass is free of $As_2O_3$, because arsenic is toxic and thus should be avoided. The same also belongs to $Sb_2O_3$.

Furthermore, the cladding glass may comprise fluorine and/or fluoride and/or chlorine and/or chloride. Preferably, the content of fluoride is up to 0.6% by weight, further preferably up to 0.55% by weight. Chloride can be contained in the glass in a content of at most 0.2, preferably up to 0.15% by weight. Particular embodiments of the cladding glass are free of fluorine and/or fluoride and/or chlorine and/or chloride.

The following table shows some preferred compositions of cladding glasses, that can be used along with the glass according to the present invention. The cladding glasses contain (in percent by weight on the basis of oxides):

| Oxides | group 1 | group 2 | group 3 | group 4 |
|---|---|---|---|---|
| $SiO_2$ | 70-78 | 63-75 | 75-85 | 62-70 |
| $Al_2O_3$ | 5-10 | 1-7 | 1-5 | 1-10 |
| $B_2O_3$ | 5-14 | 0-3 | 10-14 | >15 |
| $Li_2O$ | free | 0-1 | 0-3 | <0.1 |
| $Na_2O$ | 0-10 | 8-20 | 2-8 | 0-10 |
| $K_2O$ | 0-10 | 0-6 | 0-1 | 0-10 |
| MgO | 0-1 | 0-5 | free | 0-5 |
| CaO | 0-2 | 1-9 | free | 0-5 |
| SrO | 0-1 | free | free | 0-5 |
| BaO | 0-1 | 0-5 | free | 0-5 |
| F | 0-1 | 0-1 | free | 0-1 |

A person skilled in the art is able, due to his knowledge in the art, to use still other cladding glasses. However, it is not foreseeable with certainty if cladding glasses, even if the necessary physical features are existent, do harmonize with the core glasses in every case and result in good step-index fibers. It is therefore advisable to experimentally test an intended cladding glass-core glass matching in each individual case on its fitness for use.

DETAILED DESCRIPTION

Examples

Figure 1:
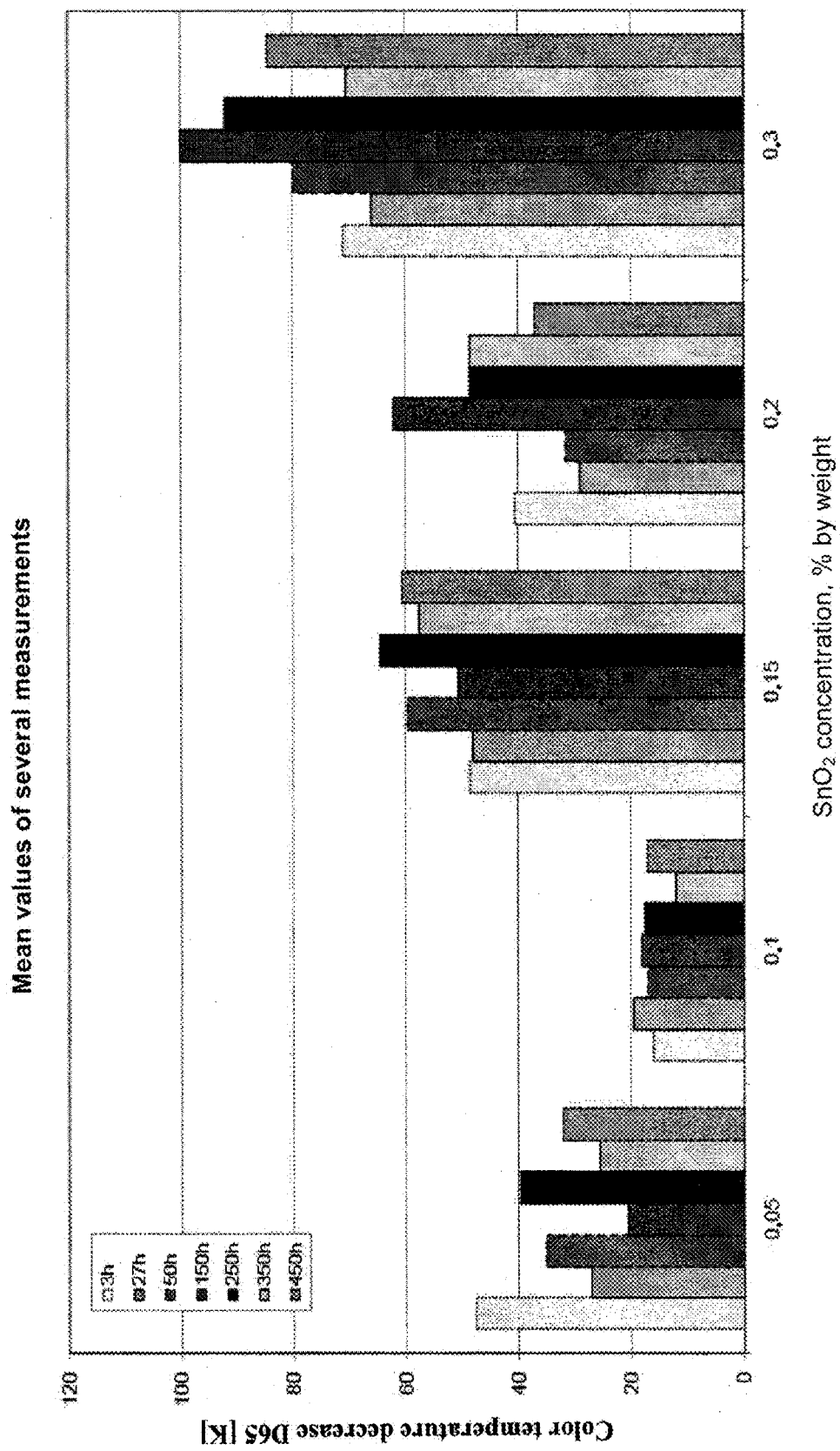
FIG. 1 is a bar graph that shows the influence of the content of $SnO_2$ in the glass on the solarization resistance.

For the manufacture of glasses according to the present invention, compositions from conventional raw materials, irrespective of unavoidable impurities, were put in and melted in a high-frequency heated skull crucible at 1500-1580° C. over a time of 3 hours. The melt was heated to a temperature of 1550-1630° C. and subsequently refined for 45 min. The temperature was subsequently decreased to 1540° C. and bubbling was performed with oxygen over 30 min. The temperature was then, over the course of 15-20 minutes, decreased to 1450° C. and the glass was cast. From 660° C. on the cooling of the glass blocks took place with a rate of 10 K/h until it reached ambient temperature.

The results are summarized in TABLE 1. The details for the composition of the optical glasses/core glasses are indicated in percent by weight on the basis of oxides and were analyzed. Furthermore, $n_d$ means the refractive index, $v_d$ the Abbe number, Pg,F the relative fraction of dispersion for the wavelengths g and F, $\alpha_{20/300}$ the linear coefficient of thermal expansion in the range of 20° C. to 300° C. according to ISO 7991, Tg the glass transformation temperature according to ISO7884, the density according to the Buoancy flotation method correspondent to the Archimedean principle, CR the climate resistance according to ISO/WD 13384, FR the staining resistance according to the SCHOTT-method and AR the resistance to alkaline according to ISO/DIN10629.

TABLE 1

| Ex. | 1 | 2 | 3 | 4 | 5 | 6 | 7 | 8 | 9 | 10 | 11 |
|---|---|---|---|---|---|---|---|---|---|---|---|
| $SiO_2$ | 48.79 | 42.73 | 47.71 | 48.6 | 51.8 | 33 | 47.5 | 42.8 | 43.73 | 33.47 | 43.31 |
| $B_2O_3$ | | | | | 8 | 8 | | | 11.88 | 11.63 | |
| $Al_2O_3$ | 9 | 2 | | | | | | | 0.22 | 0.19 | |
| $P_2O_5$ | | | | | | | | | | | |
| $Li_2O$ | | | 0.9 | | | 1.8 | 0.82 | 0.71 | 0 | | 0.7 |
| $Na_2O$ | 9 | 6 | 8.3 | 8.2 | 9 | 4 | 6.86 | 5.8 | 5.67 | 4.9 | 5.8 |
| $K_2O$ | | | 5.8 | 9.1 | 3 | 1 | 6.48 | 3.7 | 0.66 | 0.57 | 3.7 |
| CaO | | | | | | | | | | | |
| SrO | | | | | | | | | | | |

TABLE 1-continued

| | | | | | | | | | | | |
|---|---|---|---|---|---|---|---|---|---|---|---|
| BaO | 20 | 28 | 0.8 | 0.8 | 22 | 22 | 0.9 | 9.2 | 29.95 | 40.24 | 9 |
| ZnO | 1 | 8 | 34.4 | 33 | 6 | 30 | 27.6 | 21.2 | 7.63 | | 21.2 |
| La$_2$O$_3$ | 9 | 5 | | | | | 5.64 | 10.7 | | 6.32 | 10.8 |
| ZrO$_2$ | 3 | 8 | 1.8 | | | | 3.81 | 4.9 | | 2.46 | 4.9 |
| HfO$_2$ | 0.06 | 0.17 | 0.04 | | | | 0.08 | 0.6 | | 0.05 | 0.59 |
| SnO$_2$ | 0.15 | 0.10 | 0.25 | 0.3 | 0.2 | 0.2 | 0.31 | 0.39 | 0.26 | 0.17 | 0.15 |
| MnO | | | | | | | | | | | 0.00015 |
| sum | 100 | 100 | 100 | 100 | 100 | 100 | 100 | 100 | 100 | 100 | 100 |
| properties | | | | | | | | | | | |
| $n_d$ | 1.5828 | 1.6097 | 1.58 | 1.567 | 1.556 | 1.617 | 1.58825 | 1.62361 | 1.5830 | 1.6240 | 1.6234 |
| $v_d$ | 51.6 | 53.0 | | | | 52.4 | 51.06 | 49.9 | 58.7 | 56 | 50.2 |
| PgF | | | | | | | 0.5538 | 0.5557 | | | |
| $\alpha_{(20-300°\ C.)}$ [10$^{-6}$/K] | 7.9 | 8.1 | | | | | 8.74 | 8.22 | 8.18 | 9.25 | 7.96 |
| Tg [° C.] | 529 | 617 | | | | | 534 | 563 | 573 | 584 | 568 |
| ρ [g/cm$^3$] | 2.97 | 3.49 | | | | | 3.13 | 3.44 | 3.23 | 3.6 | 3.44 |
| CR [class] | 1 | 1 | | | | | 1 | 1 | | | |
| AR [class] | 1.0 | 1.0 | | | | | 1.0 | 1.0 | | | |
| FR [class] | 0 | 0 | | | | | 0 | 0 | | | |
| D (1050 nm) [dB/km]* | — | — | — | — | — | — | 180 | 117 | 250 | 300 | |

| Ex. | 12 | 13 | 14 | 15 | 16 | 17 | 18 | 19 | 20 |
|---|---|---|---|---|---|---|---|---|---|
| SiO$_2$ | 50 | 45 | 44 | 31.07 | 30.98 | 24.26 | 25.75 | 29.6 | 27.90 |
| B$_2$O$_3$ | 1 | 6 | 1 | 2.37 | 2.42 | 4.52 | 3.24 | 3.50 | 3.50 |
| Al$_2$O$_3$ | 1 | 4 | 2 | | | | | | |
| P$_2$O$_5$ | 0.1 | 4 | 2 | | | | | | |
| Li$_2$O | 3 | 5 | | 0.86 | 1.09 | 0.45 | 0.86 | 0.86 | 1.22 |
| Na$_2$O | 2 | 2 | 3 | 1.04 | 1.04 | | | | |
| K$_2$O | 2 | 2 | 7 | 1.55 | 1.55 | 0.28 | | | |
| CaO | 1 | 6 | 5 | | | | | | |
| SrO | | | | | | | | 0.01 | 0.02 |
| BaO | 9.9 | 6 | 8 | 22.32 | 17.96 | 34.13 | 23.16 | 16.30 | 23.20 |
| ZnO | 23 | 14 | 25 | 16.84 | 19.61 | | 14.23 | 21.60 | 16.20 |
| La$_2$O$_3$ | 5 | 5 | | 15.73 | 13.89 | 13.29 | 23.24 | 18.40 | 18.50 |
| Ta$_2$O$_5$ | | | | 3.35 | 6.50 | 21.57 | 4.58 | 4.80 | 4.70 |
| ZrO$_2$ | 2 | 1 | 3 | 4.75 | 4.81 | 1.45 | 4.84 | 4.40 | 4.30 |
| SnO$_2$ | 0.10 | 0.10 | 0.12 | 0.12 | 0.15 | 0.07 | 0.10 | 0.14 | 0.21 |
| HfO$_2$ | | | | | | 0.02 | 0.09 | 0.08 | 0.07 |
| properties | | | | | | | | | |
| $n_d$ | 1.5739 | 1.5588 | 1.5869 | 1.68826 | 1.69171 | 1.73162 | 1.73339 | 1.70863 | 1.72019 |
| $v_d$ | 53.03 | 55.63 | 51.29 | 48.23 | 47.06 | 45.35 | 46.93 | 48.02 | 47.19 |
| PgF | 0.5446 | 0.5436 | 0.5536 | 0.558 | 0.559 | 0.562 | 0.5591 | 0.5589 | 0.5591 |
| $\alpha_{(20-300°\ C.)}$ [10$^{-6}$/K] | 7.0 | 7.9 | 7.7 | n.b. | n.b. | 8.4 | 7.71 | 6.60 | 7.51 |
| Tg [° C.] | 541 | 429 | 561 | n.b. | n.b. | 665 | 631 | 611 | 597 |
| ρ [g/cm$^3$] | 3.15 | 2.8 | 3.11 | 4.04 | 4.03 | 4.18 | 4.40 | 4.22 | 4.28 |
| CR [class] | | | | | | 1 | | | |
| AR [class] | | | | | | 1.0 | | | |
| FR [class] | | | | | | 1 | | | |
| D (1050 nm) [dB/km]* | | | | | | | | | 1052 |

| Ex. | 21 | 22 | 23 | 24 | 25 | 26 | 27 | 28 | 29 | 30 |
|---|---|---|---|---|---|---|---|---|---|---|
| SiO$_2$ | 28.10 | 27.80 | 27.70 | 28.10 | 28.20 | 29.80 | 28.80 | 29.10 | 29.10 | 29.30 |
| B$_2$O$_3$ | 3.00 | 3.30 | 3.40 | 3.30 | 3.40 | 3.50 | 2.40 | 1.02 | 3.30 | 3.30 |
| Al$_2$O$_3$ | | | | | | | | | 0.02 | |
| P$_2$O$_5$ | | | | | | | | | | |
| Li$_2$O | 0.80 | 1.09 | 0.96 | 0.85 | 0.89 | 0.88 | 0.88 | 0.93 | 0.92 | 0.89 |
| Na$_2$O | | | | | | | | | | |
| K$_2$O | | | | | | | | | | |
| CaO | | | | | | | | | | |
| SrO | 0.02 | 0.02 | 0.02 | 0.02 | | 0.02 | 0.03 | 0.03 | | 0.03 |
| BaO | 28.30 | 22.50 | 22.40 | 25.40 | 28.40 | 22.00 | 29.60 | 29.60 | 29.30 | 29.60 |
| ZnO | 12.50 | 17.10 | 17.60 | 14.90 | 13.70 | 17.80 | 13.10 | 13.90 | 12.40 | 13.00 |
| La$_2$O$_3$ | 18.20 | 15.30 | 17.60 | 18.20 | 16.30 | 18.40 | 18.70 | 19.00 | 18.50 | 18.60 |
| Ta$_2$O$_5$ | 4.60 | 8.30 | 5.70 | 4.70 | 4.60 | 2.90 | 1.90 | 1.80 | 1.80 | 0.67 |
| ZrO$_2$ | 4.20 | 4.20 | 4.30 | 4.20 | 4.20 | 4.30 | 4.30 | 4.40 | 4.30 | 4.30 |
| SnO$_2$ | 0.09 | 0.14 | 0.12 | 0.10 | 0.10 | 0.10 | 0.09 | 0.10 | 0.09 | 0.09 |
| HfO2 | 0.07 | 0.06 | 0.07 | 0.07 | | 0.08 | 0.08 | 0.08 | 0.08 | 0.08 |
| properties | | | | | | | | | | |
| $n_d$ | 1.7177 | 1.7240 | 1.7211 | 1.7179 | 1.7139 | 1.7159 | 1.7145 | 1.7190 | 1.7074 | 1.7043 |
| $v_d$ | 47.61 | 46.03 | 46.94 | 47.44 | 47.79 | 46.84 | 48.17 | 47.71 | 48.87 | 49.12 |
| PgF | 0.5593 | 0.5600 | 0.5577 | 0.5591 | 0.5653 | 0.5591 | 0.5576 | 0.5587 | 0.5567 | 0.5569 |
| $\alpha_{(20-300°\ C.)}$ [10$^{-6}$/K] | 7.79 | 7.23 | 7.44 | 7.49 | 7.74 | 7.12 | 7.98 | 7.99 | 7.85 | 7.9 |
| Tg [° C.] | 624 | 602 | 613 | 623 | 612 | 600 | 631 | 646 | 618 | 610 |
| ρ [g/cm$^3$] | 4.33 | 4.32 | 4.30 | 4.30 | 4.28 | 4.18 | 4.29 | 4.34 | 4.22 | 4.19 |
| CR [class] | 1 | 1 | | | 1 | | 1 | | | |

TABLE 1-continued

| | | | | | | | | | | |
|---|---|---|---|---|---|---|---|---|---|---|
| AR [class] | 1.0 | 1.0 | | | 1.0 | | 1.0 | | | |
| FR [class] | 1 | 1 | | | 2 | | 2 | | | |
| D (1050 nm) [dB/km]* | 721 | 883 | 738 | 518 | 637 | 660 | 898 | 714 | 1238 | 1193 |

*not irradiated

In TABLE 2 two cladding glasses with their respective compositions are listed (according to analysis in percent per weight on the basis of oxides). Furthermore, $n_d$ means the refractive index, $\alpha_{20/300}$ the linear coefficient of thermal expansion in the range of 20° C. to 300° C. according to ISO 7991, EW the softening temperature at a viscosity of $10^{7.6}$ dPas, S the resistance to acids according to ISO 12116, L the resistance to bases according to DIN ISO 695.

TABLE 2

| | Example | |
|---|---|---|
| | A | B |
| | type of cladding glass | |
| | group 1 | group 2 |
| SiO₂ | 73.9 | 69.9 |
| B₂O₃ | 9.60 | 1.0 |
| Na₂O | 6.60 | 12.6 |
| K₂O | 2.56 | 3.2 |
| MgO | 0.01 | 2.7 |
| CaO | 0.63 | 5.1 |
| BaO | 0.04 | 2.1 |
| Al₂O₃ | 6.62 | 4.0 |
| TiO₂ | | 0.1 |
| F | 0.08 | 0.2 |
| Cl | 0.18 | |
| Fe₂O₃ | 4.E−02 | |
| Sb₂O₃ | <0.005 | |
| As₂O₃ | <0.005 | 0.1 |
| Sum | 100.26 | 101 |
| Properties | | |
| $n_d$ | 1.49 | 1.514 |
| $\alpha_{(20-300° C.)}$ [10⁻⁶/K] | 5.5 | 9.1 |

TABLE 2-continued

| | Example | |
|---|---|---|
| | A | B |
| | type of cladding glass | |
| | group 1 | group 2 |
| EW [° C.] | 790 | 720 |
| S [class] | 1 | 1 |
| L [class] | 2 | 2 |

Because the glasses according to this invention are particularly suitable as core glasses for optical fibers, selected core glasses of TABLE 1 together with selected cladding glasses of TABLE 2, optical fibers with a diameter of 30, 50 and 70 μm were manufactured and their physical data determined which are shown in TABLE 3.

The manufacture of fibers was carried out according to the established rod-pipe pulling process on a conventional rod-pipe pulling machine with a cylindrical oven according to prior art. The attenuation of the fibers was determined according to DIN 58141 part 1. ÖW is the opening angle and was determined according to DIN 5814-3, ΔÖW is the difference of the opening angles of the 1 m long and 3.8 m long and in average 50 μm wide fibers.

The color temperature [K] of the emitted light from the fiber after the passage of a certain fiber distance was determined after irradiation of norm light D65 (color temperature 6504 K). The results are listed in table 3. The attenuation at different light wavelengths was indicated in dB km⁻¹ and the opening angle as well as the difference of the opening angles was indicated in degrees.

TABLE 3

| | core glass Ex. from Tab. 1 | | | | | |
|---|---|---|---|---|---|---|
| | 19 | 20 | 21 | 22 | 23 | 24 |
| | cladding glass-Ex. from Tab. 2 | | | | | |
| properties step-index fibers | A | A | A | A | A | A |
| attenuation 550 nm, Ø 50 μm, [dB/km] | 287 | 292 | 215 | 240 | 401 | 339 |
| attenuation 610 nm Ø 50 μm, [dB/km] | 374 | 411 | 306 | 333 | 469 | 386 |
| ÖW 1 m, Ø 50 μm [°] | 117 | 103 | 121 | 122 | 123 | 122 |
| ÖW 3.8 m, Ø 50 μm [°] | 99 | 83 | 113 | 104 | 108 | 113 |
| Δ ÖW betw. 1 m and 3.8 m, Ø 50 μm [°] | 18 | 20 | 8 | 18 | 15 | 9 |

| | core glass Ex. from Tab. 1 | | | | | | |
|---|---|---|---|---|---|---|---|
| | 25 | 26 | 27 | 28 | 29 | 30 | 26 |
| | cladding glass-Ex. from Tab. 2 | | | | | | |
| properties step-index fibers | A | A | A | A | A | A | B |
| attenuation 550 nm, Ø 50 μm, [dB/km] | 200 | 274 | 206 | 276 | 264 | 244 | 420 |
| attenuation 610 nm Ø 50 μm, [dB/km] | 275 | 373 | 313 | 357 | 424 | 393 | 490 |
| ÖW 1 m, Ø 50 μm [°] | 121 | 109 | 120 | 65 | 118 | 118 | 102 |
| ÖW 3.8 m, Ø 50 μm [°] | 113 | 100 | 113 | 54 | 114 | 112 | 84 |
| Δ ÖW betw. 1 m and 3.8 m Ø 50 μm [°] | 8 | 9 | 7 | 9 | 4 | 6 | 18 |

The following TABLE 4 shows the effects of measures according to the present invention on a variety of variants of example glass 8:

TABLE 4

| | | Ex. 8 | | | | |
| --- | --- | --- | --- | --- | --- | --- |
| Variant | Bubbling | D (920 nm) [dB/km] | Δ (900-700 nm) | D 1050 nm [dB/km] | $T_{Bubbling}$ [° C.] | $t_{Bubbling}$ [min] |
| a | yes | 158 | 32 | 170 | 1450 | 30 |
| b | yes | 196 | 44 | 207 | 1430 | 30 |
| c | yes | 339 | 132 | 368 | 1450 | 15 |
| d | yes | 286 | 102 | 310 | 1450 | 30 |
| e | yes | 206 | 54 | 238 | 1400 | 30 |
| f | yes | 266 | 95 | 290 | 1450 | 30 |
| g | yes | 225 | 61 | 245 | 1450 | 30 |
| h | yes | 117 | 17 | 129 | 1440 | 30 |
| i | yes | 116 | 19 | 125 | 1450 | 30 |
| j | yes | 116 | −5 | 118 | 1480 | 30 |
| k | yes | 174 | 22 | 183 | 1450 | 30 |
| l | yes | 208 | 48 | 222 | 1480 | 30 |
| m | yes | 127 | 16 | 136 | 1480 | 30 |
| n | no | 801 | 338 | 864 | — | — |
| o | no | 663 | 255 | 714 | — | — |

The different attenuations result on the one hand from different refining temperatures and on the other hand from the fact that the raw materials have been purchased from different producers. It can be seen that from all measures the bubbling process has the strongest effect on the attenuation.

TABLE 5

| | | Ex. 7 | | | | |
| --- | --- | --- | --- | --- | --- | --- |
| Variant | Bubbling | D (920 nm) [dB/km] | Δ (900-700 nm) | D 1050 nm [dB/km] | $T_{Bubbling}$ [° C.] | $t_{Bubbling}$ [min] |
| a | no | 338 | 126 | 410 | — | — |
| b | yes | 253 | 94 | 279 | 1460 | 30 |

Also for example glass 7 a clear relationship between the bubbling and the attenuation was shown.

The following table 6 shows the relationship between the content of $Sn^{2+}$ in a sample and the refining temperature on the one hand and the bubbling on the other hand (quantities in % by weight).

TABLE 6

| Glass | LT* (° C.) | Bubbling | $Sn^g$ | $Sn^{2+}$ | $Sn^{2+}/Sn$ |
| --- | --- | --- | --- | --- | --- |
| 8 | 1700 | yes | 0.1 | 0.005 | 5% |
| 8 | 1550 | no | 0.1 | 0.005 | 5% |
| 7 | 1800 | no | 0.11 | 0.010 | 10% |
| 8 | 1700 | no | 0.11 | 0.010 | 10% |
| 8 | 1710 | no | 0.11 | 0.014 | 13% |

*refining temperature;
$g$ total amount of Sn

It can be seen that at high temperatures a larger part of the tin is present in reduced form. So that $SnO_2$ acts as a refining agent however very high temperatures are necessary. The table shows that in the case of bubbling according to the present invention after the refining step the content of $Sn^{2+}$ is decreased. The influence of the bubbling process is particularly obvious. The ratio of $Sn^{2+}$ to the total content of tin is in the same order than the ratio of $Fe^{2+}$ to the total content of iron.

The determined values are associated with a high measurement error. Therefore, the glasses according to the present invention are characterized by the attenuation in dB/km. The following example shows that a reduced content of $Fe^{2+}$ in the glass has a strong positive influence on the attenuation. This is promoted by the relatively low refining temperatures which allow a refining process with $SnO_2$, by additional $O_2$ bubbling which oxidizes and homogenizes the glass and reduces scattering terms, and by the use of highly pure raw materials.

DETAILED DESCRIPTION

FIG. 1 shows the influence of the content of $SnO_2$ in the glass on the solarization resistance. The figure illustrates only a selection of many experiments and analyses which have been conducted for determining the optimum content of the refining agent with respect to the solarization resistance.

The results shown are mean values of several measurements. The single bars show the extent of the decrease of the color temperature D65 in K after irradiation for a certain time. The irradiation was conducted with a 300 W xenon high pressure short-arc lamp. It can be seen that the solarization always was low enough that the decrease of the color temperature has never reached the limit of 150 K. As mentioned above, with the naked eye a decrease of the color temperature starting from about 150 K is discernible. The glass used had the following composition, see example glass 8.

Higher amounts of $SnO_2$ did not result in a further improvement of the solarization resistance. Rather there is an optimum with respect to the solarization behavior and an optimum with respect to the refining effect. These two optima are not identical so that an average between a good refining process and a lower solarization had to be found.

Figure 2:
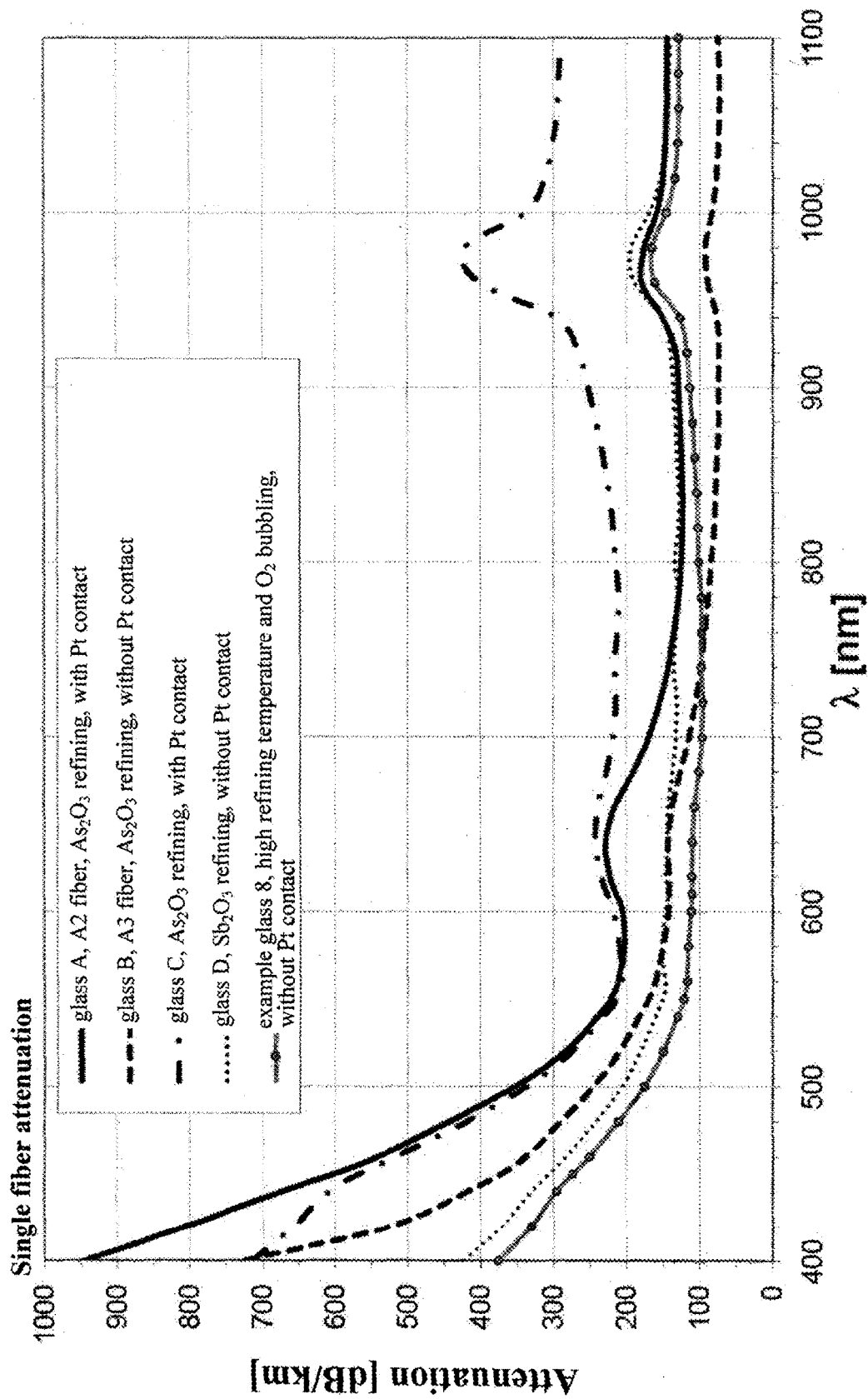
FIG. 2 is a line graph that shows the attenuation spectrum of different glasses.

FIG. 2 shows the attenuation spectrum of different glasses. It can be seen that the glasses differ in two ranges with respect to the attenuation, namely on the one hand in the range of small wave lengths around 400 nm (blue edge) and on the other hand in the range around 920 to 1100 nm.

It can be seen that conventional core glasses containing PbO indeed have good properties (glass B). Glasses which have had contact with platinum components show strong absorption in the UV range (glass A).

The glasses A and B are fiber glasses containing lead. With $As_2O_3$ refining they indeed have good IR attenuation values. But nevertheless, they show high attenuation values in the UV range, when produced in a conventional tank (glass A) consisting of a Quarzal basin, Pt refining chamber and homogenization system, i.e. these glasses were in contact with platinum during their production.

Also glass B is a lead glass which was produced in a silica glass crucible and thus had no contact with platinum.

Glass C is a lead-free fiber glass which was molten in the conventional tank and refined with $As_2O_3$. $As_2O_3$ refines at lower temperatures than $SnO_2$ and promotes the redox ratios in the glass so that also in the IR range good attenuation values are achieved. But however due to its toxicity and the solarization effects caused (not shown here) it is not desirable.

Also, glass D is a lead-free glass produced with $Sb_2O_3$ refining in a silica glass crucible without platinum contact. The attenuation values of this glass in the UV range and also in the IR range are very good. But also, $Sb_2O_3$ is not desirable due to its toxicity and the solarization provably caused (not shown here).

Example glass 8 is the glass according to the present invention with $SnO_2$ refining. It was bubbled with oxygen after the refining process. The attenuation values of this glass in the UV range and also in the IR range are very good.

Figure 3:
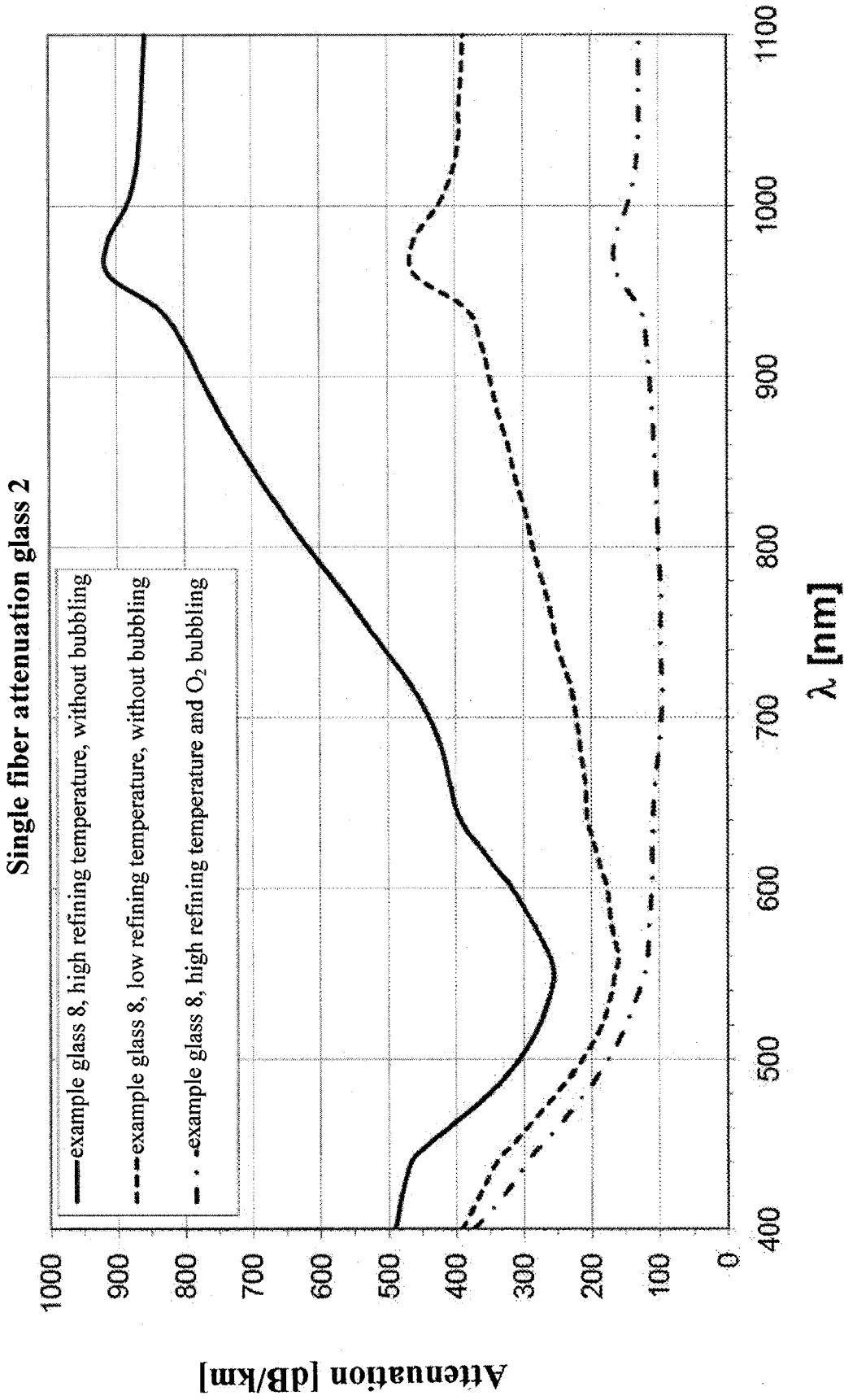
FIG. 3 is a line graph that shows the effect of the bubbling procedure after the refining process.

FIG. 3 shows very nicely, how strong the effect of the bubbling procedure after the refining process is. It can easily be seen that with an increase of the refining temperature also the attenuation increases very strongly. But according to the present invention it has to be refined at high temperatures. With bubbling after the refining process the attenuation is even improved in such a high extent that better values are achieved than in the case of a refining process at low temperature.

Figure 4:
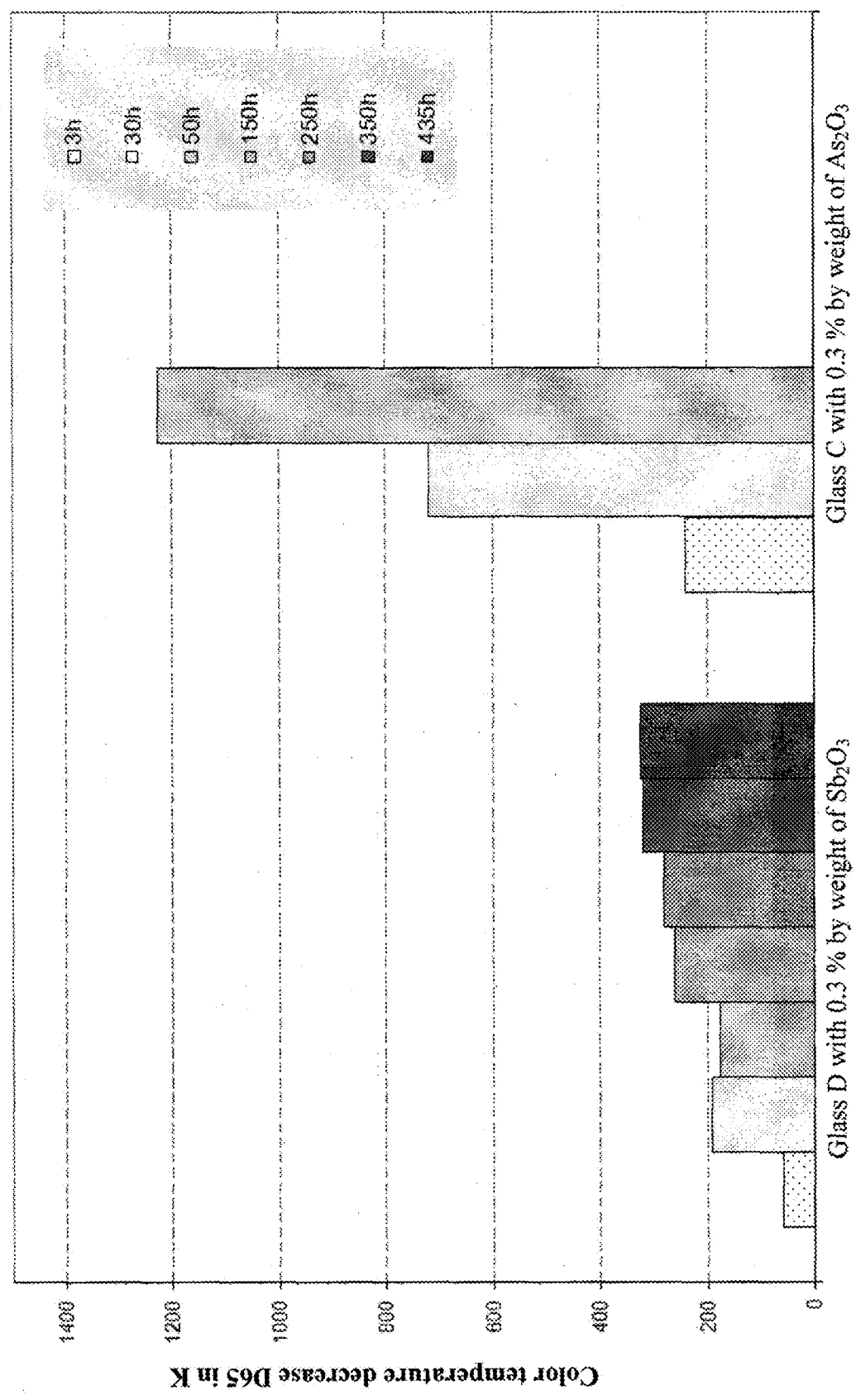
FIG. 4 is a bar graph that shows the decrease of the color temperature after irradiation.

FIG. 4: The single bars show the extent of the decrease of the color temperature D65 in K after irradiation for a certain time for an $As_2O_3$ and an $Sb_2O_3$ refined glass. The irradiation was conducted with a 300 W xenon high pressure short-arc lamp. The length of the optical fiber was 1 m. Already after 3 h (in the case of the $As_2O_3$ refined glass) and after 30 h (in the case of the $Sb_2O_3$ refined glass) of irradiation, respectively, the decrease of the color temperature is >150 K and the effect is strengthened at least by a factor of two in the case of an irradiation time which is longer than 3 h.

Figure 5:
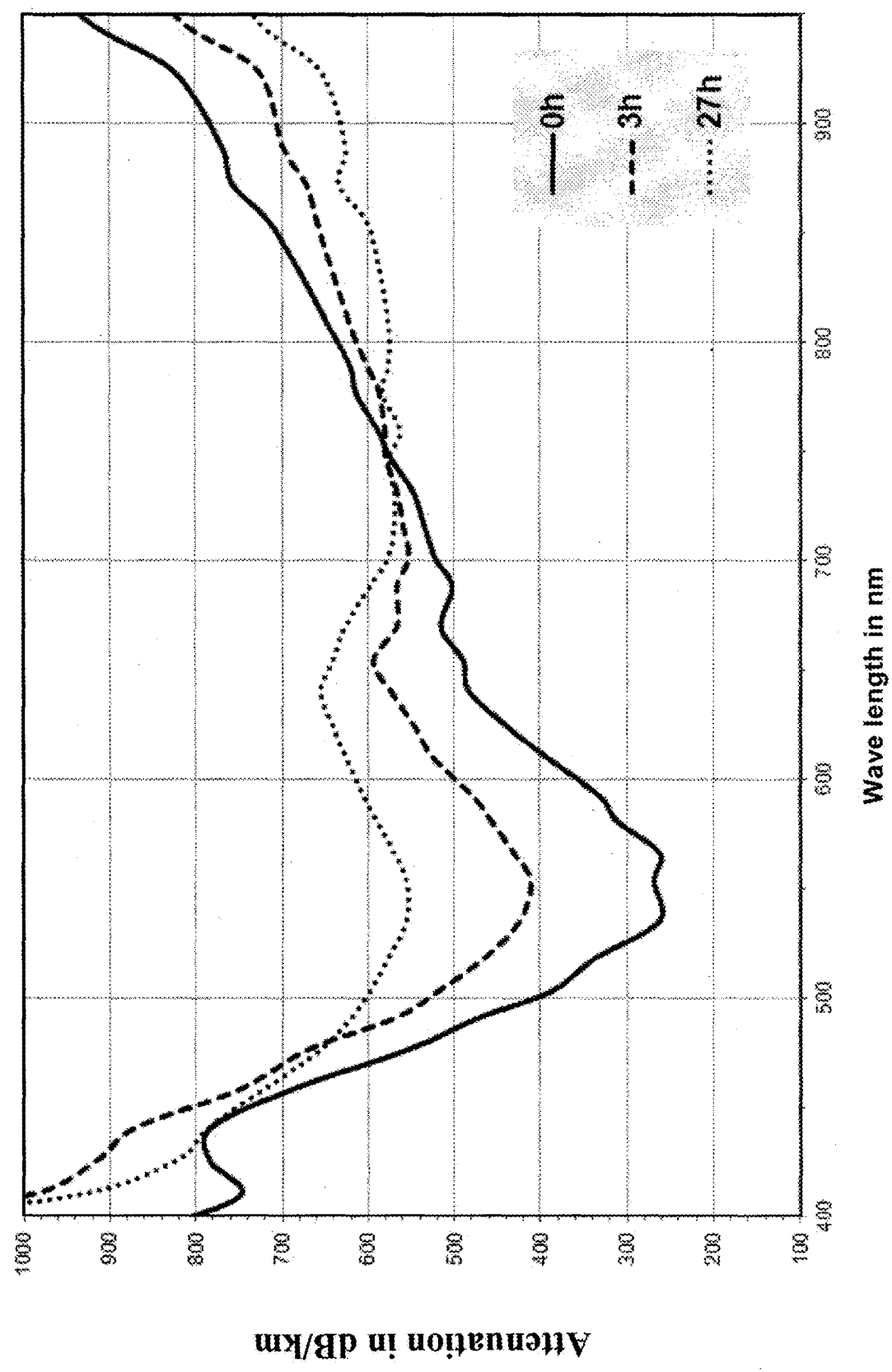
FIG. 5 is a line graph that shows the attenuation spectrum after three hours.

FIG. 5 shows the attenuation spectrum of a glass containing manganese (Ex. 11) prior and after irradiation. The band at approximately 550 nm already induced by a 3 h irradiation with a 300 W xenon high pressure short-arc lamp results in an increase of the attenuation in this wave length range to higher than 300 dB/km.

Figure 6:
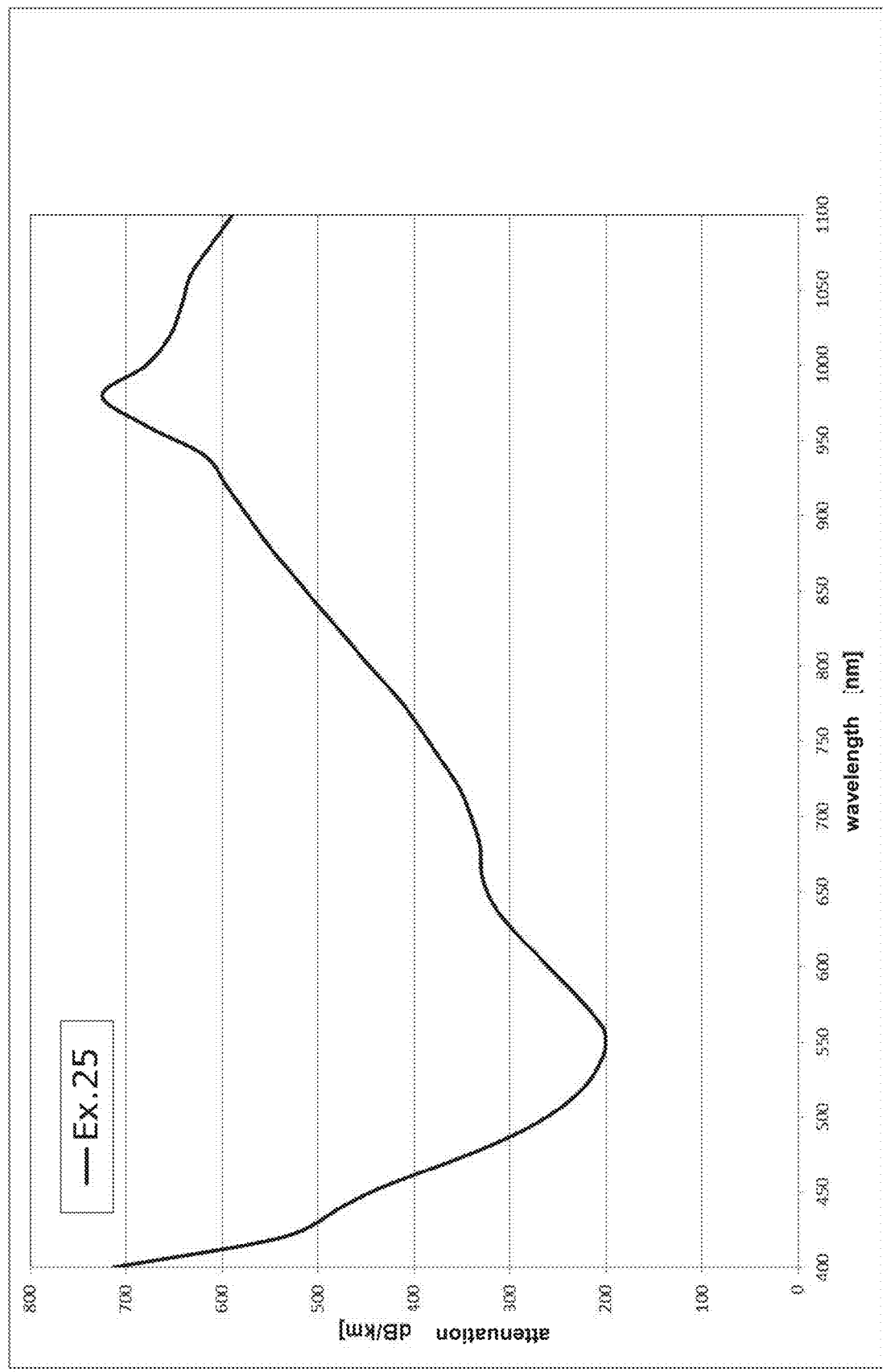
FIG. 6 is a line graph that shows the spectrum of attenuation.

FIG. 6 shows the spectrum of attenuation of example glass 25.

What is claimed is:

1. A glass having improved solarization resistance comprising $SnO_2$ and having an attenuation of ≥1300 dB/km at a wavelength of 1050 nm, the glass comprising the following components in the amounts indicated in percent by weight:

| | from | To |
|---|---|---|
| $SiO_2$ | 35 | 55 |
| $Al_2O_3$ | 0 | 2.8 |
| BaO | 0 | 12.8 |
| ZnO | 16 | 28 |
| $La_2O_3$ | 5 | 21 |
| $ZrO_2$ | 1 | 8 |
| $SnO_2$ | >0 | 2 |
| Σ $R_2O$ | 6 | 18 | wherein $R_2O$ is the sum of the contents of all alkali metal oxides.

2. The glass according to claim 1, wherein the attenuation at a wavelength of 1050 nm is <400 dB/km.

3. The glass according to claim 1, wherein the attenuation at a wavelength of 1050 nm is from 400 to 1300 dB/km.

4. The glass according to claim 1, wherein the glass comprises $Fe^{2+}$ and/or $Fe^{3+}$ in a content of 0 to 10 ppm.

5. The glass according to claim 1, wherein the glass contains MnO in a concentration of <200 ppb.

6. The glass according to claim 1, wherein the glass contains MnO in a concentration of 200 to 500 ppb.

7. The glass according to claim 1, wherein the glass is free of PbO, $As_2O_3$ and $Sb_2O_3$.

8. The glass according to claim 1, wherein the glass is free of $B_2O_3$.

9. The glass according to claim 1, wherein the glass is free of $TiO_2$.

10. The glass according to claim 1, wherein the glass is free of $Ag_2O$.

11. The glass according to claim 1, further comprising $HfO_2$ in an amount of at least 0.02% by weight.

12. The glass according to claim 1, wherein the glass further comprises the following components in the amounts indicated in percent by weight:

| | from | To |
|---|---|---|
| $SiO_2$ | 35 | 53 |
| $Al_2O_3$ | 0 | 1.5 |
| $Li_2O$ | 0.2 | <3 |
| $Na_2O$ | 2 | 9 |
| $K_2O$ | 0.9 | 12 |
| $HfO_2$ | 0.02 | 1.5 |
| MgO | 0 | 8 |
| CaO | 0 | 8 |
| SrO | 0 | 4 |
| $Ta_2O_5$ | 0 | 6 |
| $Y_2O_3$ | 0 | 11.9 |
| $Rb_2O$ | 0 | 1.5 |
| $Cs_2O$ | 0 | 1.5 |
| $GeO_2$ | 0 | 3 |
| F | 0 | 2 |
| Σ $R_2O$ | 6 | 15 |
| Σ MgO, CaO, SrO, ZnO | 20 | 42. |

13. The glass according to claim 1, further comprising an amount of $Sn^{2+}$ of at most 5%, based on the total content of tin.

14. The glass according to claim 1, further comprising a content of $SnO_2$ of at least 0.01 and at most 1% by weight.

15. A method for the production of the glass of claim 1, comprising the steps of:
melting the glass mixture in a melting vessel; and
refining the melt in a refining vessel.

16. An optical fiber comprising:
the glass according to claim 1 as a core glass; and
a cladding glass sheathing the core glass.

17. A use of the glass according to claim 1 as a core glass in an optical fiber.

18. The glass according to claim 1, wherein the mass ratio of BaO to ZnO is at least 0.01 and does not exceed a value of 2.5.

\* \* \* \* \*